US008458784B2

(12) United States Patent
Krumel

(10) Patent No.: US 8,458,784 B2
(45) Date of Patent: *Jun. 4, 2013

(54) DATA PROTECTION SYSTEM SELECTIVELY ALTERING AN END PORTION OF PACKETS BASED ON INCOMPLETE DETERMINATION OF WHETHER A PACKET IS VALID OR INVALID

(75) Inventor: Andrew K. Krumel, San Jose, CA (US)

(73) Assignee: 802 Systems, Inc., Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/807,641

(22) Filed: Sep. 10, 2010

(65) Prior Publication Data

US 2011/0197273 A1 Aug. 11, 2011

Related U.S. Application Data

(63) Continuation of application No. 11/374,465, filed on Mar. 13, 2006, now abandoned, which is a continuation of application No. 09/611,775, filed on Jul. 7, 2000, now Pat. No. 7,013,482.

(51) Int. Cl.
  *G06F 17/00* (2006.01)
  *G06F 15/16* (2006.01)
  *G06F 9/00* (2006.01)

(52) U.S. Cl.
  USPC .......... 726/13; 713/154; 726/11; 726/12; 709/229

(58) Field of Classification Search
  USPC .......... 713/154; 709/229; 726/11, 12, 13
  See application file for complete search history.

(56) References Cited

U.S. PATENT DOCUMENTS 4,941,198 A * 7/1990 Johnson et al. ............... 455/9
5,343,471 A 8/1994 Cassagnol .................. 370/401

(Continued)

FOREIGN PATENT DOCUMENTS

JP 09117448 A 5/1997
WO WO 96/34479 10/1996

(Continued)

OTHER PUBLICATIONS

Xu, Jun and Mukesh Singhal. "Design and Evaluation of a High-Performance ATM Firewall Switch and Its Applications", Jun. 1999.*

(Continued)

*Primary Examiner* — Michael Simitoski
(74) *Attorney, Agent, or Firm* — Loudermilk & Associates

(57) ABSTRACT

Methods and systems for firewall/data protection that filters data packets in real time and without packet buffering are disclosed. A data packet filtering hub, which may be implemented as part of a switch or router, receives a packet on one link, reshapes the electrical signal, and transmits it to one or more other links. During this process, a number of filters checks are performed in parallel, resulting in a decision about whether each packet should or should not be invalidated by the time that the last bit is transmitted. To execute this task, the filtering hub performs rules-based filtering on several levels simultaneously, preferably with a programmable logic or other hardware device. Various methods for packet filtering in real time and without buffering with programmable logic are disclosed. The system may include constituent elements of a stateful packet filtering hub, such as microprocessors, controllers, and integrated circuits. The system may be reset, enabled, disabled, configured, and/or reconfigured with toggles or other physical switches. Audio and visual feedback may be provided regarding the operation and status of the system.

36 Claims, 14 Drawing Sheets

U.S. PATENT DOCUMENTS

| | | | |
|---|---|---|---|
| 5,426,378 A | 6/1995 | Ong | 326/39 |
| 5,426,379 A | 6/1995 | Trimberger | 326/39 |
| 5,530,695 A | 6/1996 | Dighe | 370/232 |
| 5,590,060 A | 12/1996 | Granville | 702/155 |
| 5,657,316 A | 8/1997 | Nakagaki | 370/394 |
| 5,740,375 A | 4/1998 | Dunne et al. | 395/200.68 |
| 5,745,229 A | 4/1998 | Jung et al. | 356/73 |
| 5,794,033 A | 8/1998 | Aldebert et al. | 395/653 |
| 5,805,816 A * | 9/1998 | Picazo et al. | 709/223 |
| 5,835,726 A | 11/1998 | Shwed et al. | 395/200.59 |
| 5,884,025 A | 3/1999 | Baehr et al. | 395/187.01 |
| 5,903,566 A | 5/1999 | Flammer | 370/406 |
| 5,905,859 A | 5/1999 | Holloway | 713/201 |
| 5,968,176 A | 10/1999 | Nessett et al. | 713/201 |
| 5,974,547 A | 10/1999 | Klimenko | 713/2 |
| 6,003,133 A | 12/1999 | Moughanni et al. | 713/200 |
| 6,009,475 A | 12/1999 | Shrader | 709/249 |
| 6,011,797 A | 1/2000 | Sugawara | 370/395.51 |
| 6,020,758 A | 2/2000 | Patel | 326/40 |
| 6,049,222 A | 4/2000 | Lawmann | 326/38 |
| 6,052,785 A | 4/2000 | Lin | 709/225 |
| 6,052,788 A | 4/2000 | Wesinger | 713/201 |
| 6,076,168 A | 6/2000 | Fiveash | 713/201 |
| 6,078,736 A | 6/2000 | Guccione | 395/500.17 |
| 6,092,108 A | 7/2000 | DiPlacido | 709/224 |
| 6,092,123 A | 7/2000 | Steffan | 710/8 |
| 6,101,540 A * | 8/2000 | Graf | 709/224 |
| 6,108,786 A | 8/2000 | Knowlson | 726/11 |
| 6,133,844 A | 10/2000 | Ahne | 340/815.45 |
| 6,134,662 A | 10/2000 | Levy | 713/200 |
| 6,151,625 A | 11/2000 | Swales | 709/218 |
| 6,175,839 B1 | 1/2001 | Takao | 715/500 |
| 6,182,225 B1 | 1/2001 | Hagiuda | 713/201 |
| 6,215,769 B1 | 4/2001 | Ghani | 370/230 |
| 6,219,706 B1 | 4/2001 | Fan et al. | 709/225 |
| 6,222,547 B1 | 4/2001 | Schwuttke et al. | 345/419 |
| 6,223,242 B1 | 4/2001 | Sheafor et al. | 710/317 |
| 6,243,815 B1 | 6/2001 | Antur et al. | 726/11 |
| 6,289,013 B1 | 9/2001 | Lakshman et al. | 370/389 |
| 6,310,692 B1 | 10/2001 | Fan | 358/1.14 |
| 6,321,338 B1 | 11/2001 | Porras et al. | 726/25 |
| 6,326,806 B1 | 12/2001 | Fallside | 326/38 |
| 6,333,790 B1 | 12/2001 | Kageyama | 358/1.15 |
| 6,335,935 B2 | 1/2002 | Kadambi | 370/396 |
| 6,343,320 B1 | 1/2002 | Fairchild | 709/249 |
| 6,363,519 B1 | 3/2002 | Levi | 716/16 |
| 6,374,318 B1 | 4/2002 | Hayes | 710/107 |
| 6,389,544 B1 | 5/2002 | Katagiri | 713/300 |
| 6,414,476 B2 | 7/2002 | Yagi | 324/124 |
| 6,430,711 B1 | 8/2002 | Sekizawa | 714/47 |
| 6,549,947 B1 | 4/2003 | Suzuki | 709/229 |
| 6,608,816 B1 | 8/2003 | Nichols | 370/235 |
| 6,628,653 B1 | 9/2003 | Salim | 370/389 |
| 6,640,334 B1 | 10/2003 | Rasmussen | 717/110 |
| 6,691,168 B1 | 2/2004 | Bal | 709/238 |
| 6,700,891 B1 | 3/2004 | Wong | |
| 6,701,432 B1 * | 3/2004 | Deng et al. | 713/153 |
| 6,734,985 B1 | 5/2004 | Ochiai | 358/1.15 |
| 6,771,646 B1 | 8/2004 | Sarkissian | 370/392 |
| 6,772,347 B1 * | 8/2004 | Xie et al. | 726/11 |
| 6,779,004 B1 | 8/2004 | Zintel | 709/227 |
| 6,791,992 B1 | 9/2004 | Yun | 370/415 |
| 6,795,918 B1 * | 9/2004 | Trolan | 713/160 |
| 6,990,591 B1 | 1/2006 | Pearson | 726/22 |
| 2001/0039579 A1 | 11/2001 | Trcka et al. | 709/224 |

FOREIGN PATENT DOCUMENTS

| | | |
|---|---|---|
| WO | WO 99/48303 | 9/1999 |
| WO | WO 00/02114 | 1/2000 |

OTHER PUBLICATIONS

"Baseband Specification Part B", Bluetooth Spec. v. 1.1, Edited by Henrik Hedlund in conjunction with Bluetooth.org, Feb. 2001, Available from Internet: http://www.bluetooth.com/developer/specification/core.asp, pp. 41-46.

Comer, Douglas, "Internetworking with TCP/IP. vol. 1: Principles, Protocols, and Architectures", 4$^{th}$ Edition, New Jersey: Prentice Hall, 2000, Ch. 7, pp. 95-113, Ch. 12, pp. 197-206.

Feit. Dr. Sidnie, "Architecture, Protocols, and Implementation with IPv6 and IP Security," TCP/IP Signature Edition, San Francisco: McGraw-Hill, Ch. 9: pp. 274-282, Ch. 11: pp. 432-457, 1999.

"Host Controller Interface Functional Specification, Part H:1" Edited by Christian Johansson in conjunction with Bluetooth.org., Feb. 2001, Available from Internet: http://www.bluetooth.com/developer/specification/core.asp, pp. 543-550.

"Jini Architecture Specifications." Version 1.1, Sun Microsystems, Inc., Oct. 2000. Available from Internet: http://www.sun.com/jini/specs/jini$_{13}$1.pdf, pp. 1-20.

"Jini Device Architecture Specifications." Version 1.1, Sun Microsystems, Inc., Oct. 2000. Available from Internet: http://www.sun.com/jini/specs/devicearch1_1.pdf, pp. 1-14.

"Logical Link Control and Adaptation Protocol Specification." Part D, Edited by Jon Inouye in conjunction with Bluetooth.org., Feb. 2001, Available from Internet: http://www.bluetooth.com/developer/specification/core.asp, pp. 257-260.

Sollins, K., "The TFTP Protocol (Revision 2.0)", MIT, Jul. 1992. Available from Internet: http://www.cis.ohio-state.edu/cgi-bin/rfc/rfc1350.html, pp. 1-10.

Tanenbaum, Andrew S., "Computer Networks", 3$^{rd}$ Edition, Vrije Universiteit, Amsterdam, The Netherlands, pub. New Jersey: Prentice Hall, 1996, 28-44.

Wilder, Floyd, "A Guide to the TCP/IP Protocol Suite", 2$^{nd}$ Edition, Boston: Artech House, 1998, Ch. 3, pp. 123-162.

3Com, "SuperStack 3 Firewall" 2000 3Com.

Hughes, James "A High Speed Firewall Architecture for ATM/OC-3c" Feb. 1996.

IBM Technical Disclosure Bulletins NN8606320 (1986), NN950431 (1995), NA81123528 (1981), NN9704141 (1997), NN9512419 (1995), NN9502341 (1995), NN9308183 (1993), NN8606254 (1986), NN83102393 (1983).

Lakshman, T.V. "High Speed Policy-Based Packet Forwarding Using Efficient Multi-Dimensional Range Matching" 1998 ACM, pp. 203-214.

Network ICE Corp., "Black ICE Pro User's Guide Version 2.0" Jun. 2000 (archive.org).

Packeteer, Inc., "PacketShaper 4000 Getting Started Version 4.0" Mar. 1999.

Symantec, Inc. "Norton Personal Firewall 2000 User's Guide Version 2.0" Jun. 2000 (archive.org).

Xu, Jun and Mukesh Singhal "Design of a High-Performance ATM Firewall" 1999 ACM.

Xu, Jun and Mukesh Singhal, "Design of a High-Performance ATM Firewall" 1998 ACM pp. 93-102.

AARNet, "ATM", <http://www.aarnet.edu.au/engineering/networkdesign/mtu/atm.html>.

Derfler, Jr., Frank J. et al. "How Networks Work" Sep. 2000, pp. 162-167.

Newton, Harry, "Newton's TELECOM Dictionary" 2003 CMP Books, pp. 78-79.

Unknown, "ATM Efficiency" <http://homepages.uel.ac.uk/u0227461/Website/efficiency.htm>.

OfficeConnect Internet Firewall User Guide, 3Com, Feb. 2000, pp. 1-178.

Mogul, Jeffrey C., "Simple and Flexible Datagram Access Controls for Unix-based Gateways", Mar. 1989.

Biodata GmbH, "BIGfire + User Manual", V0306+, 1999.

Excerpts from File History related U.S. Appl. No. 09/611,775.
Excerpts from File History of related U.S. Appl. No. 11/374,465.
Excerpts from File History of related U.S. Appl. No. 09/745,599.
Excerpts from File History of related U.S. Appl. No. 12/316,129, Abandoned.
Excerpts from File History of related U.S. Appl. No. 09/746,519.
Excerpts from File History of related U.S. Appl. No. 11/405,299.
Excerpts from File History of related U.S. Appl. No. 09/746,107.

* cited by examiner

DATA PROTECTION SYSTEM SELECTIVELY ALTERING AN END PORTION OF PACKETS BASED ON INCOMPLETE DETERMINATION OF WHETHER A PACKET IS VALID OR INVALID

This application is a continuation of U.S. application Ser. No. 11/374,465, filed Mar. 13, 2006 now abandoned, which is a continuation of U.S. application Ser. No. 09/611,775, filed Jul. 7, 2000, now U.S. Pat. No. 7,013,482.

FIELD OF THE INVENTION

The present invention relates to computer security and data protection systems and methods, and more particularly to firewall and data protection systems and methods for filtering packets, such as from the Internet, in real time and without packet buffering.

BACKGROUND OF THE INVENTION

The use of the Internet has exploded in recent years. Small and large companies as well as individual users are spending more time with their computers connected to the Internet. With the advent of Internet technologies, such as cable modems, digital subscriber lines, and other "broadband" access devices, users are connecting their computers to the Internet for extended periods of time.

Such extended or "persistent" connection to the Internet brings many advantages to users in immediate access to the content on the Internet through the use of email, search engines, and the like. Unfortunately, however, persistent access to the Internet exposes connected computers to potential security threats, where intruders and "hackers" may compromise proprietary systems, engage in information theft, or take control of the connected computers remotely. With more sophisticated tools at their disposal, hackers pose security and privacy risks to systems with persistent access to the Internet. Such security risks are even present for computers connected to the Internet for limited periods of time (such as through dial-up, modem connections), though to a lesser degree than the extended access computers.

There are currently many different types of firewall systems available on the market, including proxy servers, application gateways, stateful inspection firewalls, and packet filtering firewalls, each of which provides a variety of strategies and services for data protection. Conventional packet filters typically are computers, routers, or ASICs based on general purpose CPUs. They perform their filtering duties by receiving a packet, buffering the data until a determination can be made, and forwarding the packet as applicable for the particular system. For example, a dual-homed, Linux-based filter with two network cards might receive a packet completely, evaluate whether it meets specific criteria, and transmit the packet on the other network card. In another example, a router designed for switch mode routing might begin buffering a packet until a decision is made, then forward the packet on the applicable interface while still receiving the packet. With most packet filters, software is used and data is buffered.

Sophisticated computer users working for medium- to large-sized companies have a variety of relatively expensive protection devices and tools at their disposal. Such devices and tools typically screen data packets received from the Internet with sophisticated software-based filtering techniques. Using relatively complex tools for software analysis, each packet is stored in a buffer and examined sequentially with software-based rules, which results in each packet being either accepted (and passed to the computer) or rejected (and disposed of by the software). This software often requires substantial computer knowledge and experience. Users of such devices and tools typically have an expertise in network administration or a similar field, so they can configure, optimize, and even build the complex filtering and security options provided by the software.

While such devices and tools can be quite effective in providing "firewall" protection for sophisticated users of large office systems, they pose several barriers to unsophisticated users of small office and home systems in the growing SOHO market. Current large office systems are expensive, difficult to set up, and require technical skills. What is needed for SOHO systems is a relatively inexpensive, uncomplicated, "plug and play" type of Internet protection system that can be easily connected and configured by relatively unsophisticated users.

SUMMARY OF THE INVENTION

In accordance with the present invention, devices, methods and systems are provided for the filtering of Internet data packets in real time and without packet buffering. A stateful packet filtering hub is provided in accordance with preferred embodiments of the present invention. The present invention also could be implemented as part of a switch or incorporated into a router.

A packet filter is a device that examines network packet headers and related information, and determines whether the packet is allowed into or out of a network. A stateful packet filter, however, extends this concept to include packet data and previous network activity in order to make more intelligent decisions about whether a packet should be allowed into or out of the network. An Ethernet hub is a network device that links multiple network segments together at the medium level (the medium level is just above the physical level, which connects to the network cable), but typically provides no capability for packet-type filtering. As is known, when a hub receives an Ethernet packet on one connection, it forwards the packet to all other links with minimal delay and is accordingly not suitable as a point for making filtering-type decisions. This minimum delay is important since Ethernet networks only work correctly if packets travel between hosts (computers) in a certain amount of time.

In accordance with the present invention, as the data of a packet comes in from one link (port), the packet's electrical signal is reshaped and then transmitted down other links. During this process, however, a filtering decision is made between the time the first bit is received on the incoming port and the time the last bit is transmitted on the outgoing links. During this short interval, a substantial number of filtering rules or checks are performed, resulting in a determination as to whether the packet should or should not be invalidated by the time that the last bit is transmitted. To execute this task, the present invention performs multiple filtering decisions simultaneously: data is received; data is transmitted; and filtering rules are examined in parallel and in real time. For example, on a 100 Mbit/sec Ethernet network, 4 bits are transmitted every 40 nano seconds (at a clock speed of 25 MHz). The present invention makes a filtering decision by performing the rules evaluations simultaneously at the hardware level, preferably with a programmable logic device.

The present invention may employ a variety of networking devices in order to be practical, reliable and efficient. In addition, preferred embodiments of the present invention may include constituent elements of a stateful packet filtering hub, such as microprocessors, controllers, and integrated circuits, in order to perform the real time, packet-filtering, without requiring buffering as with conventional techniques. The present invention preferably is reset, enabled, disabled, configured and/or reconfigured with relatively simple toggles or other physical switches, thereby removing the requirement for a user to be'trained in sophisticated computer and network configuration. In accordance with preferred embodiments of the present invention, the system may be controlled and/or configured with simple switch activation(s).

Accordingly, one object of the present invention is to simplify the configuration requirements and filtering tasks of Internet firewall and data protection systems.

Another object is to provide a device, method and system for Internet firewall and data protection that does not require the use of CPU-based systems, operating systems, device drivers, or memory bus architecture to buffer packets and sequentially carry out the filtering tasks.

A further object of the present invention is to perform the filtering tasks of Internet firewall protection through the use of hardware components.

Another object is to utilize programmable logic for filtering tasks.

Still another object is to provide a device, method, and system to carry out bitstream filtering tasks in real time.

Yet another object is to perform parallel filtering, where packet data reception, filtering, and transmission are conducted simultaneously.

A further object of the present invention is to perform the filtering tasks relatively faster than current state-of-the-art, software-based firewall/data protection systems.

Another object is to provide a device, method and system for firewall protection without the use of a buffer or temporary storage area for packet data.

Still another object of the present invention is to design a device, method and system that does not require software networking configurations in order to be operational.

A further object of the present invention is to provide a device, method and system for Internet firewall and data security protection that supports partitioning a network between client and server systems.

It is a yet another object of the present invention to provide a device, method and system for Internet firewall and data protection that supports multiple networking ports.

Another object is to maintain stateful filtering support for standard data transmission protocols on a per port basis.

Still another object of is to configure network functionality using predefined toggles or other types of physical switches.

A further object of the present invention is to conduct packet filtering without requiring a MAC address or IP address to perform packet filtering.

Yet another object of the present invention is to facilitate the shortest time to carry out bitstream filtering tasks.

Finally, it is another object of the present invention to be able to perform filtering rules out of order and without the current state-of-the-art convention of prioritizing the filtering rules serially.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

Figure 1A:
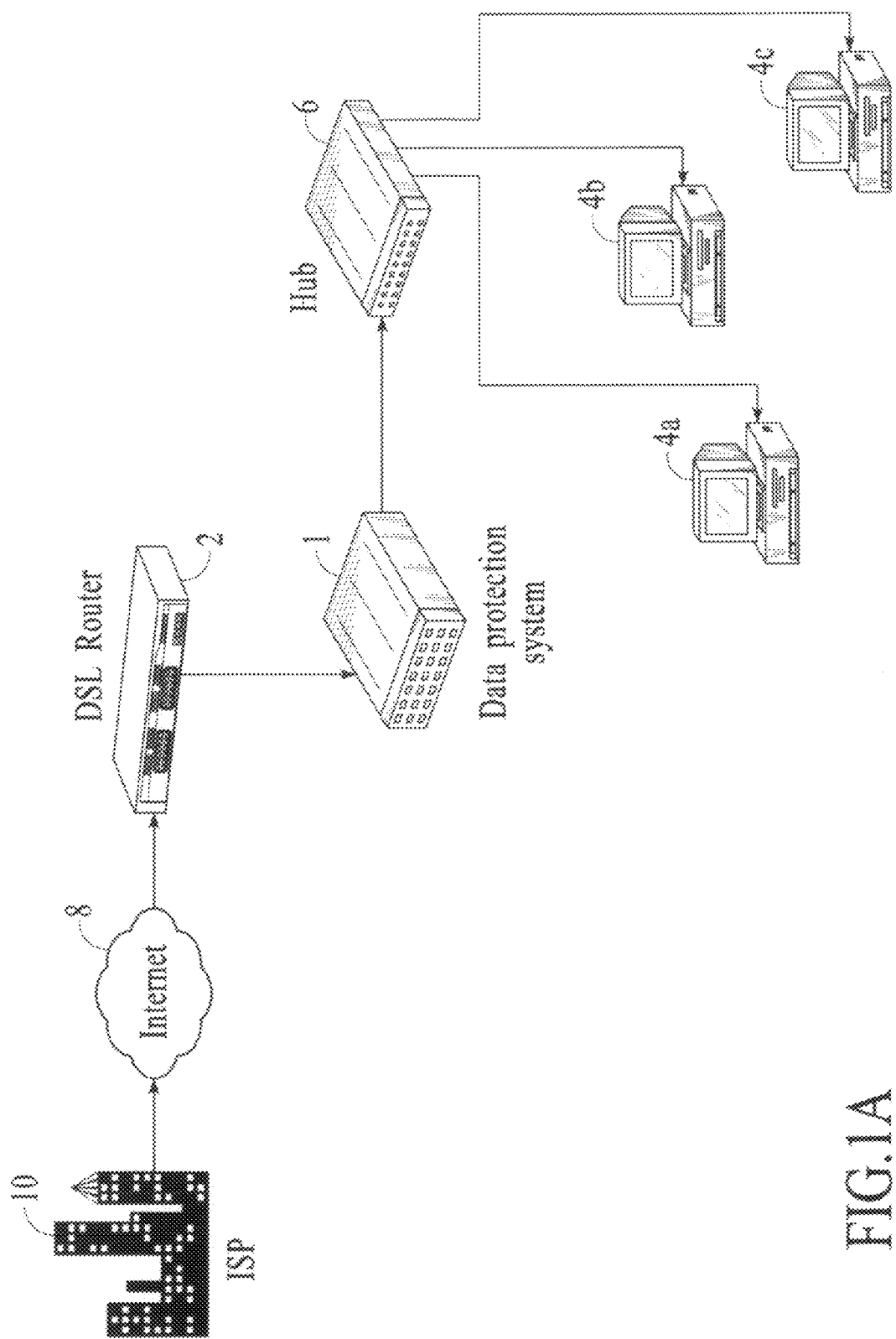
FIGS. 1A and 1B are application level diagrams illustrating exemplary data protection systems in accordance with the present invention.
Figure 1B:
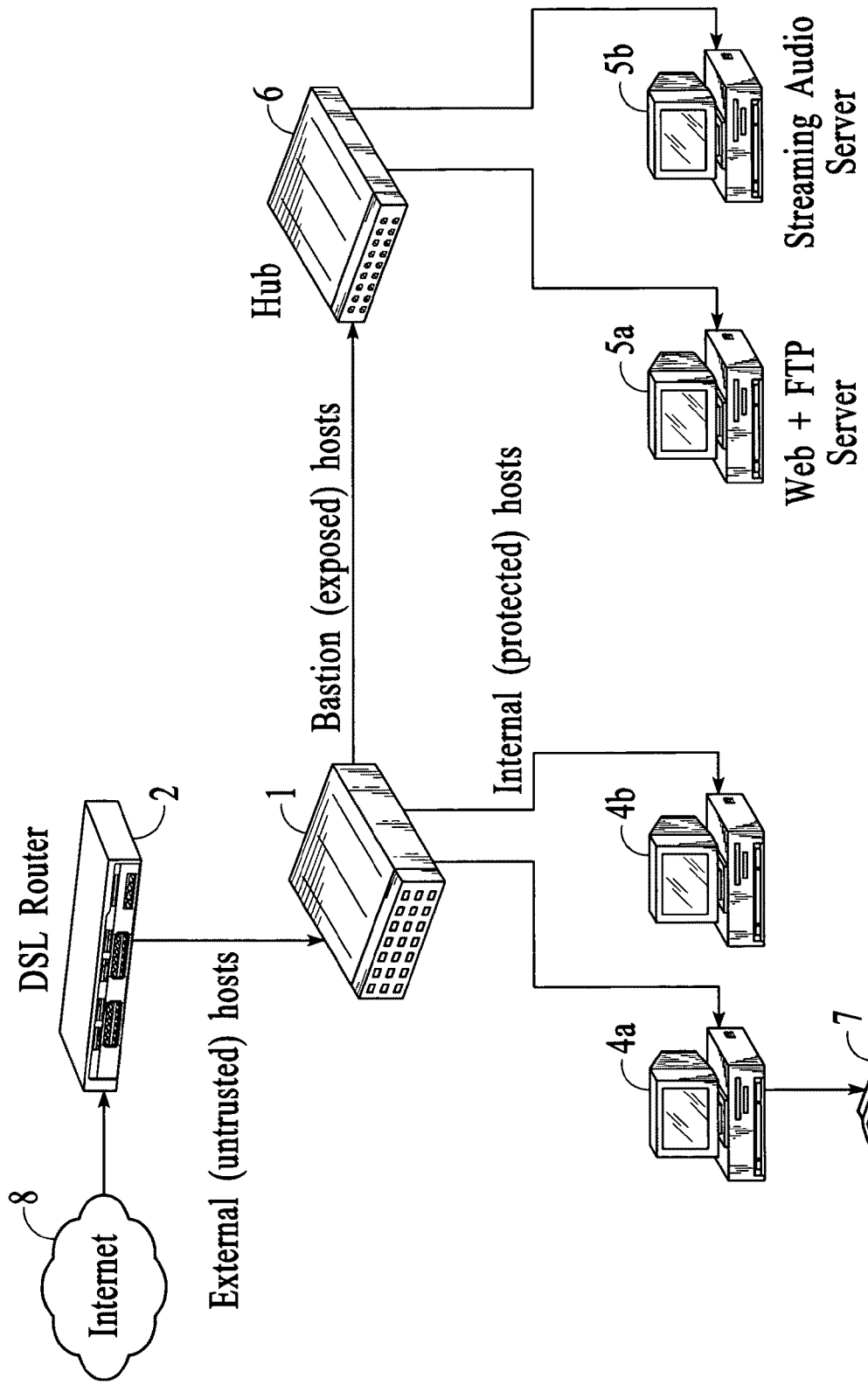

FIG. 1A and FIG. 1B illustrate the physical positioning of a stateful packet filtering hub in accordance with the present invention in two exemplary network configurations. The packet filtering hub of the illustrated embodiments preferably serves as an Internet firewall/data protection system (hereafter "data protection system").

With reference to FIG. 1A, in the illustrated embodiment data protection system 1 is coupled through a port to router 2 (or cable modem or other preferably broadband, persistent network connection access device), which is linked through a broadband connection to other computer systems and networks, exemplified by Internet 8 and Internet Service Provider (ISP) 10. Packets of data are transmitted from an ISP, such as ISP 10, via Internet 8 to router 2. The packets are transmitted to data protection system 1, which analyzes the packets in "real time" and without buffering of the packets, while at the same time beginning the process of transmitting the packet to the internal network(s) in compliance with the timing requirements imposed by the Ethernet or other network standards/protocols. If a packet of data satisfies the criteria of the rules-based filtering performed within data protection system 1, which is executed in a manner to be completed by the time the entire packet has been received by data protection system 1, then it is allowed to pass to hub 6 as a valid packet, which may then relay the cleared packet to computers 4a, 4b, 4c, etc. on the internal network. If a packet of data fails to meet the filtering criteria, then it is not allowed to pass as a valid packet and is "junked." Junking is defined as changing bits or truncating data, depending on the type of link, in a manner such that the packet is corrupted or otherwise will be detected by the receiving computers as invalid or unacceptable, etc. Without the intermediate positioning of data protection system 1, the packets would be transmitted directly to unprotected hub 6, thereby exposing computers 4a, 4b and 4c to security risks. It should also be noted that hub 6 is optional in accordance with the present invention; in other embodiments, data protection system 1 may be directly connected to a single computer or may have multiple ports that connect to multiple computers. Similar filtering is performed on packets that are to be transmitted from computers 4a, 4b, and 4c to Internet 8.

With reference to FIG. 1B, in this illustrated embodiment data protection system 1 is coupled via one port to DSL router 2 (again, the network access device is not limited to a DSL router, etc.), which provides the broadband connection to Internet 8. As with the embodiment of FIG. 1A, data protection system 1 also is coupled to a number of computers 4a, 4b, etc., on the internal network, and serves to provide filtering for packets between computers 4a and 4b and Internet 8 in the manner described in connection with FIG. 1A. In this embodiment, data protection system 1 is also connected via another port to hub 6, which serves as the main point of contact for incoming connections from the Internet for bastion hosts 5a and 5b, etc. In accordance with this embodiment, packets are transmitted to router 2 and then to data protection system 1. If the packets are approved by data protection system 1 (i.e., passing the filtering rules/checks performed with data protection system 1 while the packet is being received and transmitted), then the packets are allowed to pass as valid packets to computers 4a, 4b and hub 6. (The rules-based filtering process of preferred embodiments of the present invention will be described in more detail hereinafter.) Hub 6 may relay the packets to other internal host computers 5a, 5b, etc., on the local area network (LAN). These computers may include, for example, a Web and FTP server 5a, or a streaming audio server 5b, etc. Thus, in accordance with the illustrated embodiment, packets that passed the filtering rules/checks are passed as valid packets to computers, such as protected internal host computer 4a, which as illustrated may be connected to printer 7. In this particular embodiment, a bastion port is provided that may be used to service more than one bastion host. In other embodiments, different network configurations may be utilized in accordance with the present invention.

Figure 2:
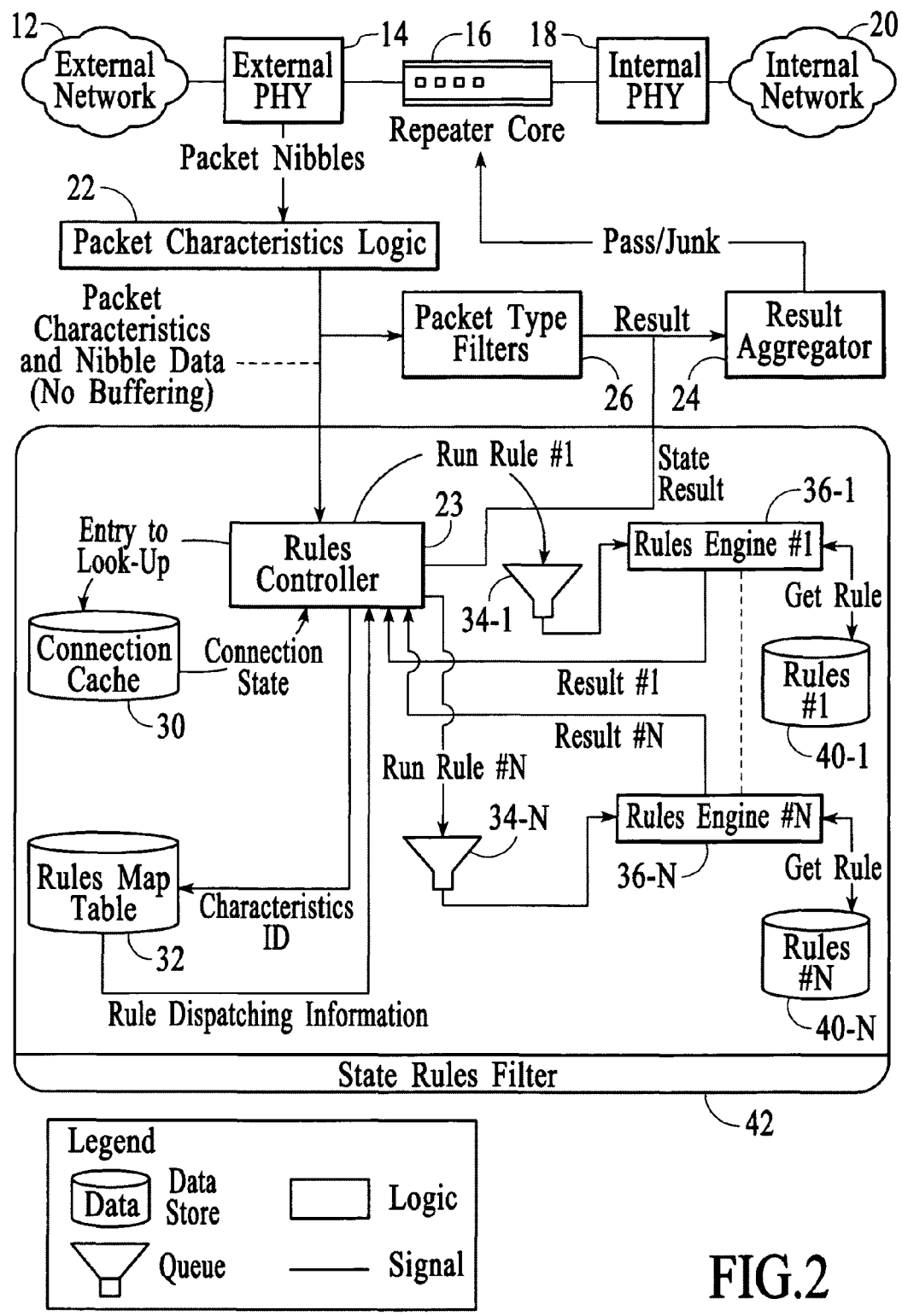
FIG. 2 is a flow diagram illustrating the components and operations of a preferred embodiment of the present invention.

FIG. 2 illustrates the general components and operations of certain preferred embodiments of the present invention. Connection to external network 12 is made by physical interface 14. Physical interface (or PHY) 14 preferably is implemented with commercially available, physical layer interface circuits, as are known in the art (such physical layer interface circuits may be off-the-shelf components, as specified in the Ethernet IEEE standard 802.3u.). At a minimum, the data protection system must contain two PHY interfaces, one for the Internet or other external network connection, and one (or more) for the internal network. It should be noted that, in preferred embodiments, PHY controllers are utilized, which implicitly assumes Ethernet-type connections. In other embodiments in accordance with the present invention, other types of PHY interfaces and controllers are utilized for different networking standards.

Repeater core 16 functions as an Ethernet repeater (as defined by the network protocols of the IEEE standard 802.3) and serves to receive packets from external PHY 14, reshape the electrical signals thereof, and transmit the packets to internal PHY 18, which is coupled to internal network 20. While the packet is being received, reshaped, and transmitted between PHYs 14 and 18, however, it is simultaneously being evaluated in parallel with filtering rules to determine if it should be allowed to pass as a valid packet (as will be described in greater detail elsewhere herein). As with the discussion regarding the PHY interfaces and controllers, changes in networking standards may alter the components functionality (such as the characteristics of repeater core 16), but not the basic parallel, real time packet filtering in accordance with the present invention. (In an alternate embodiment, for example, the data protection system may use switch logic or router logic; in full duplex, the same principles apply.)

The parallel filtering preferably consists of packet characteristics logic 22, packet type filters 26, and state rules filters 42. Packet characteristics logic 22 determines characteristics based on packet data (preferably in the form of 4-bit nibbles from PHY 14), whereas packet type filters 26 make filtering decisions generally based on packet type. State rules filters 42 perform rules-based filtering on several levels simultaneously. The results of filtering by packet type filters 26 and state rules filters 42 are combined by aggregator 24, which may be considered a type of logical operation of pass/fail signals (described in greater detail elsewhere herein). In preferred embodiments, if any one or more of the performed filtering rules indicates that the packet should be failed (or not allowed to pass as a valid packet), then the output of aggregator 24 is a fail; otherwise, the packet is allowed and the output of aggregator 24 is a pass. Thus, as packet data is being received and transmitted from PHY 14 to PHY 18 via repeater core 16, it is being evaluated in parallel via packet type filters 26 and state rules filters 42 (depending in part on packet characteristics determined by logic 22 from the data received from PHY 14). In accordance with the present invention, the results of filtering by packet type filters 26 and state rules filters 42 are provided to aggregator 24 by the time that the entire packet reaches repeater core 16, so that, based on the output of aggregator 24, the packet will either be allowed to pass as a valid packet or will be failed and junked as a suspect (or otherwise invalidated) packet.

Packet characteristics logic 22 receives packet data from PHY 14 and examines the packet data to determine characteristics, such as the packet type, datagram boundaries, packet start, packet end, data offset counts, protocols, flags, and receiving port. The packet type may include, for example, what are known in the art as IP, TCP, UDP, ARP, ICMP, or IPX/SPX. Such packet characteristics data is provided to packet type filters 26. Packet type filters 26 preferably make a decision about whether the packet should be passed or failed, with the result being transmitted to aggregator 24. In accordance with preferred embodiments, packet type filters 26 do not require the use of what may be considered an extensible rules system. The filters of packet type filters 26 preferably are expressed as fixed state machines or may be expressed using more flexible rules syntax. What is important is that packet type filtering is performed by filters 26 in the shortest time interval possible and in parallel with the packet data being received and transmitted to internal PHY 18, so that a pass/fail determination may be made prior to the time when the entire packet has been received by repeater core 16.

State rules filters 42 receive packet characteristics data from logic 22 and, based on this data as well as cached/stored connection and communication state information, executes a plurality of rules under the control of rules controller 28, preferably using a plurality of rules engines 36-1 to 36-N, so that a desired set of filtering decisions are promptly made and a pass/fail determination occurs before the entire packet has been received by repeater core 16. State rules filters 42 preserve a cache of information 30 about past network activity (such as IP addresses for established connections, port utilization, and the like), which is used to maintain network connection state information about which hosts have been exchanging packets and what types of packets they have exchanged, etc. Rules controller 28 preferably accesses rules map table 32 based on packet characteristics information, which returns rules dispatch information to rules controller 28. Thus, based on the connection state information stored in connection cache 30 and the characteristics of the packet being examined, rules controller 28 initiates filtering rules via a plurality of rules engines 36-1 to 36-N that simultaneously apply the desired set of filtering rules in parallel. (Preferably, N is determined by the number of rules that need to be performed in the available time and the speed of the particular logic that is used to implement state rules filters 42.)

As will be appreciated, while the packet pass/fail decision is being made in real time, and thus must be concluded by the time that the entire packet has been received, a large of number of filtering rules must be performed quickly and in parallel. Preferably, rules controller 28 utilizes a plurality of rules engines 36-1 to 36-N, which logically apply specific rules retrieved from corresponding storage areas 40-1 to 40-N. Rules controller 28, based on the connection state and packet characteristics, determines which rules should be run based on which information. The rules to be run are then allocated by rules controller 28 to the available rules engines 36-1 to 36-N. As each rules engine 36-1 to 36-N may be required to execute multiple rules in order to complete the filtering decision process in the required time, corresponding queues 34-1 to 34-N are preferably provided. Thus, rules controller 28 determines the list of rules that should be performed (again, depending on the stored connection state and packet characteristics data) and provides the list of rules (and accompanying information to carry out those rules) to the plurality of rules engines 36-1 to 36-N via queues 34-1 to 34-N. Rules engines 36-1 to 36-N, based on the information from the queues 34-1 to 34-N, look up specific rule information from storage areas 40-1 to 40-N, carry out the rules, and preferably return the results to rules controller 28. As the rules are essentially conditional logic statements that notify the data protection system how to react to a particular set of logical inputs, it has been determined that providing a plurality of rules engines may enable the necessary decision making process to quickly provide the outcome of the rules-based filtering by the time the entire packet has been received.

Still referring to FIG. 2, rules controller 28 preferably uses rules map table 32 to dispatch the rules to rules engines 36-1 and 36-N, so that a filtering decision may be reached in the optimal amount of time. In a preferred operation, each rules engine extracts a rule ID from its queue, looks up the rules definition in its own rules table 40-1 to 40-N, evaluates the rule, returns the result to rules controller 28, and looks for another rule ID in its queue 34-1 to 34-N. The results from packet type filter 26 and rules controller 28 are combined into one result via aggregator 24: pass or fail. If a decision is not reached before the end of the packet is transmitted, then in preferred embodiments the packet will be processed as an invalid packet and junked.

It should be appreciated that the data protection system must make a filtering determination before the current packet is completely transmitted. Since the networking standards impose strict timing thresholds on the transit delay of packets, filtering is performed in real time, in parallel and without buffering the packet. (The transit delay threshold is the time it takes to get from the transmitting station to the receiving station.) Given that a filtering decision must be made in real time (before the last bit is received and forwarded to the applicable interfaces), the filter rules are evaluated in parallel by rules engines that possess independent, direct access to the rules set collected in storage areas 40-1 and 40-N, which are preferably implemented as RAM tables. (In a preferred embodiment of the data protection system, the tables are implemented using on-chip, dual port RAM up to 4K in size. A programmable logic device, such as Xilinx Spartan II XC2S100, has 40K dual port synchronous block RAM. For example, an initial 110-bit segment of the rules controller RAM block may be a range table that delineates where each look up code begins and what the number of entries are.) Rules controller 28 dispatches the rules to each rules engine by placing a rules ID entry in a queue. Because each rules engine is assigned its own queue, a pipeline is created allowing the rules engine to continuously run and operate at maximum efficiency.

To operate efficiently the rules engines must also be capable of evaluating rules in any order. In accordance with the preferred embodiments, each rule has a priority and the highest priority result is accepted. Therefore, the rules must be evaluated in any order yet still obtain the same result, as if the rules were being evaluated serially from highest to lowest priority. This operation is accomplished in preferred embodiments by rules map table 32, which notifies rules controller 28 which rule is assigned to which rules engine. Thus, this decision is statically determined by the rules set and the number of rules engines. It should be noted that the rule set in general is greater than the number of rules engines.

Figure 3:
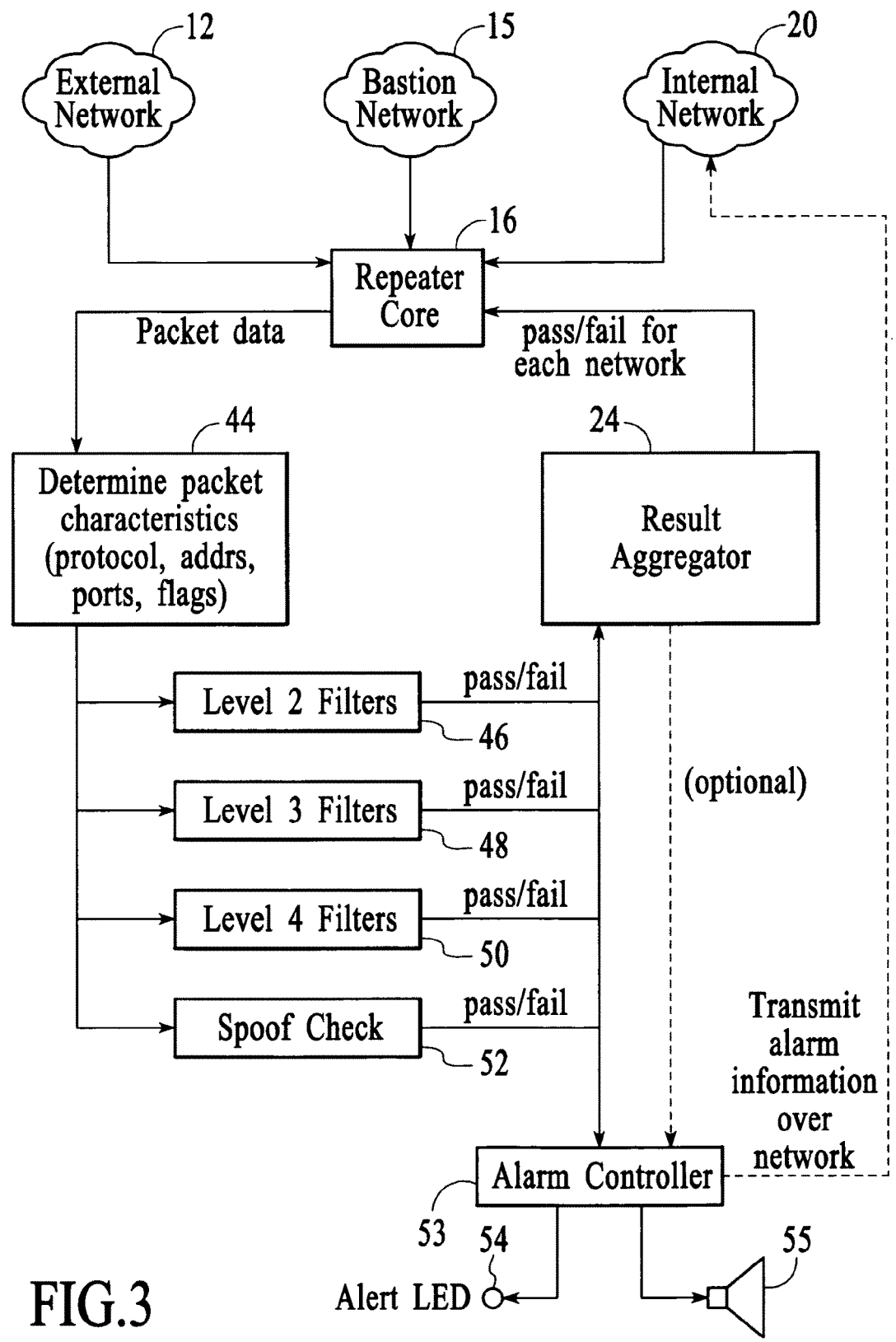
FIG. 3 is a flow chart illustrating the basic functions of a repeater core and four filter levels in accordance with preferred embodiments of the present invention.

FIG. 3 is a flow chart illustrating further aspects of preferred embodiments of the present invention. As previously described, preferred embodiments of the data protection system utilize programmable logic, or other suitable preferably hardware-based logic, to perform a large number of filter rules in parallel and at high speed. Such embodiments may be considered to provide an external interface, for instance, to the Internet, to external network 12, and one or more internal network interfaces, such as to internal network 20 and/or to bastion network 15 (see, for example, FIGS. 1A and 1B). As repeater core 16 (or the PHYs in FIG. 2) receives and transmits packet data, the packet is simultaneously subjected to a plurality of filtering rules. At step 44, the packet characteristics are determined (which, as previously described, may include protocol, addresses, ports, flags, etc.). The filtering rules are based on the packet characteristics, connection state information (depending upon the particular rules), and/or toggle or other physical switch state information. This filtering process may be represented by filtering steps 46, 48, 50 and 52, which, as depicted in FIG. 3, are performed at least in substantial part in parallel, and thus can make filtering decisions by the time the packet has been completely received.

As illustrated, after the packets are transmitted to repeater core 16, their characteristics are analyzed at step 44. Data packets generally consist of several layers of protocols that combine to make a protocol stack. Preferably, each layer of the stack is decoded and the information is passed to various filter blocks, as exemplified in steps 46, 48, 50 and 52. In accordance with the present invention, this filtering process is executed in parallel and in real time. In other embodiments, a variety of filter blocks or rules-based filters may be employed, incorporating parallel execution, real time filtering, etc., as may be necessary to complete the filtering decision in the required time.

Referring again to preferred embodiments illustrated in FIG. 3, Level 2 filters at step 46 may examine information in the link layer header for all incoming packets and decide whether a packet should be junked based on the packet protocol. Level 3 filters at step 48 may examine information in the networking layer headers. (For the IP protocol, these headers would equate to the ARP, RARP, IP, ICMP, and IGMP protocol headers.) While Level 2 filters preferably distinguish the packet type, Level 3 filters at step 48 and Level 4 filters at step 50 preferably distinguish IP datagram characteristics. Level 4 filters at step 50 preferably operate by examining IP, TCP and UDP headers along with data transmitted between the client and server processes, utilizing two techniques: stateful and non-stateful packet filtering. (Level 2, 3 and 4 filters are described in greater detail elsewhere herein.) Preferably a spoof check filter at step 52 detects whether the packet originated from an authorized IP address or not. To determine whether the packet should be allowed to pass as a valid packet, the filters must implement rules in parallel preferably based on programmable logic and register one of two values: pass or fail. After the values are registered, the outcome is collected in result aggregator 24, which logically combines the results to determine if the packet should be allowed to pass as a valid packet or should be denied as an invalid one. If the packet is passed, then repeater core 16 continues to send correct bits. If the packet is failed, then it is junked.

In accordance with preferred embodiments of the present invention as illustrated in FIG. 3, a spoof check is performed at step 52 on all packets entering a port. To prevent IP spoofing, the spoof check filtering of step 52 monitors IP addresses from the internal network and discards any incoming packets with IP source addresses that match internal IP addresses. A spoof check ensures that a host on one network is not trying to impersonate a computer on another network, such as a computer on the Internet assuming the IP address of a computer connected to an internal port. In accordance with preferred embodiments, spoofed packets are always junked by the data protection system. In such embodiments, the data protection system performs this check by keeping track of the IP addresses of packets arriving on the internal and bastion ports. The source and destination addresses of each packet are checked against the known port addresses to ensure they are valid for the appropriate port.

FIG. 3 also illustrates alarm controller 53, which preferably is coupled to result aggregator 24. Alarm controller 53, which could be a separate logic block or within the result aggregator, receives signals indicating when packets are being rejected, either directly from the logic performing the filtering or from result aggregator 24. As described in greater detail elsewhere herein, alarm controller 53 desirably is utilized to provide visual feedback of the system status or operation (such as whether the data protection system is under attack) via LED(s) 54 (or other light source, LCD or other type of alphanumeric or graphic display, etc.). For instance, a LCD may provide an additional mechanism for entering security configurations, such as specific protocols to allow a reference clock. Alarm controller 53 also may be coupled to an audio feedback device, such as speaker 55, which similarly may be used to provide audio feedback of the system status or operation. For example, if a packet is rejected, a first visual indication may be provided via LED(s) 54 (e.g., yellow light); if packets are being rejected in a manner or at a rate that suggests an internal computer is under attack, then a second visual indication may be provided via LED(s) 54 (e.g., a red light). Similarly, first and second tones or other audible indicators (different tones, volumes, sequences, etc.) may be provided via speaker 55 to indicate the detected condition). In preferred embodiments, such feedback, audio and/or visual, may maintain the alert state until reset by the user, such as by depressing a toggle. Thus, if the internal system has been determined to be under attack while the user is away, this fact will be made known to the user when the user returns and sees and/or hears the visual and/or audio feedback. It also should be noted that alarm controller 53 also may generate a UDP packet (indicated by the dashed line that is coupled to internal network 20) that informs the internal client computer of the attack or suspected attack, thereby providing an additional optional mechanism to inform the user of suspect activity.

Figure 4:
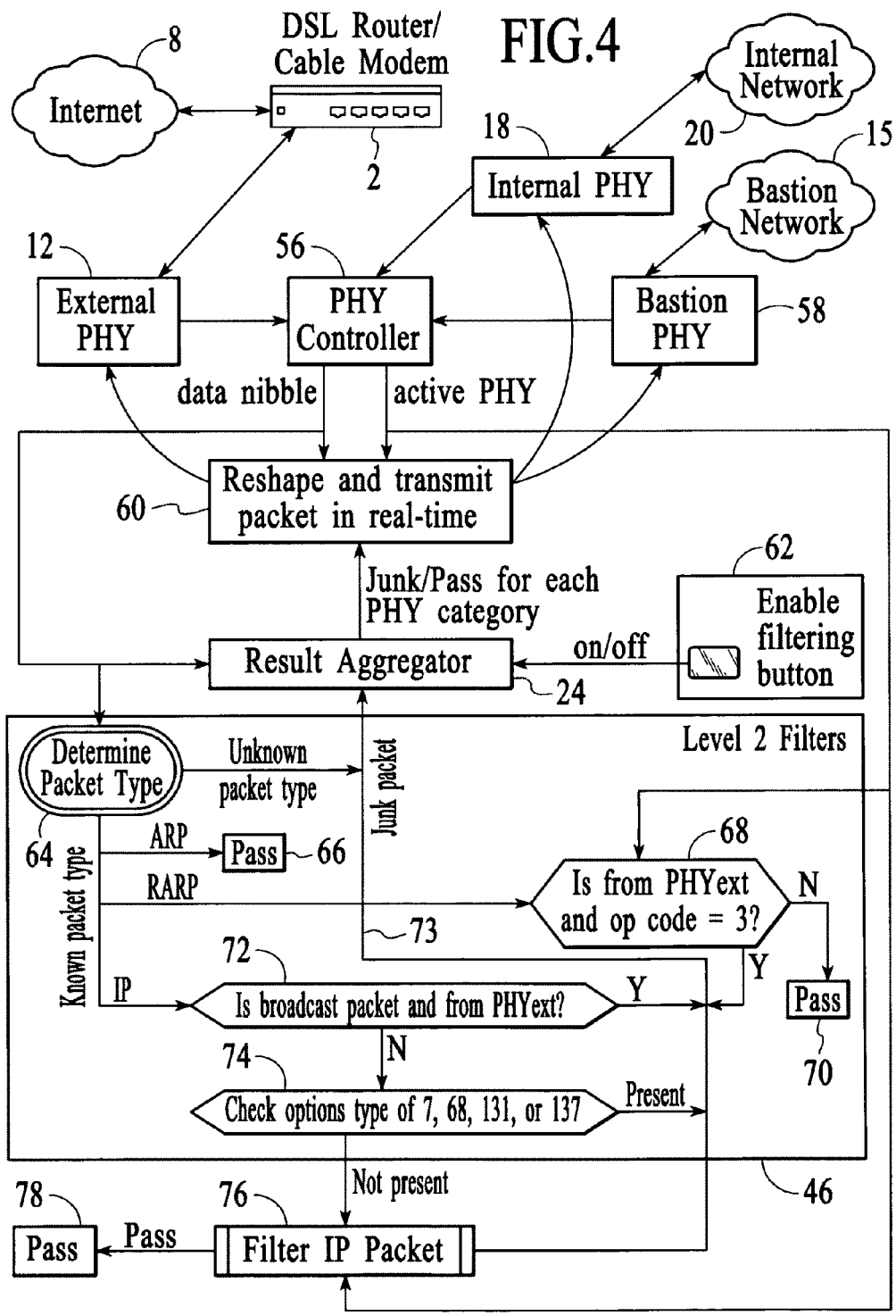
FIG. 4 is a diagram illustrating filtering functions of Level 2 filters in relation to the flow of packet data from internal and external networks in accordance with preferred embodiments of the present invention.

FIG. 4 illustrates exemplary packet filtering functions of Level 2-type filtering in relation to the flow of packet data from internal and external networks. External PHY 12 receives packet electrical signals off the physical wire or other medium. Similarly, internal PHYs 18 and 58 receive packet electrical signals from internal network 20 or bastion network 15, respectively. Packet data comes in from one of PHYs 12, 18 or 58 to PHY controller 56. PHY controller 56 in general receives incoming data from network PHYs 12, 18 or 58, detects collisions, indicates the start and end of packet data, and forwards the packet data to other appropriate components of the data protection system (such as described herein). From PHY controller 56, data from the packet being received, along with information indicating which PHYs are active (i.e., on which PHY a packet is being received and to which PHYs the packet is being transmitted, etc.), and the packet is reshaped and transmitted in real-time via block 60 (i.e., the packet is not received into a buffer, after which it is sequentially processed to determine if the packet should be allowed to pass, etc., as in conventional firewalls). In the case of a packet received from Internet 8, the packet is received by PHY controller 56 from external PHY 12, and reshaped and transmitted in real-time to the internal PHY 18 and/or bastion PHY 58.

As will be appreciated, block 60 in essence performs the repeater functionality of passing the incoming data to the non-active PHYs after reformatting the preamble. Block 60 also preferably receives "junk" or "pass" signals from the filtering components and a collision detection signal from PHY controller 56. In preferred embodiments, a "jam" signal is propagated to each PHY upon detection of a collision. A packet is invalidated for all PHYs that belong to a network category that receives a "junk" signal. (For example, if the packet is invalidated for internal networks, then the packet is invalidated for all internal network ports.) Preferably, block 60 also receives a single output signal from result aggregator 24 for each PHY category (i.e., internal or external). As will be explained in greater detail hereinafter, result aggregator 24 generates the signals provided to block 60 depending on "junk" or "pass" signals from each filter component.

In accordance with the present invention, the packet is also simultaneously routed through a plurality of filtering steps. In the exemplary illustration of Level 2 filters in FIG. 4, the packet type is determined at step 64. At step 64, the network packet is examined to determine the enclosed Level 3 datagram type, such as ARP, RARP, IP, or IPX. This information is used to perform Level 2 filtering and to decide how to deconstruct the enclosed datagram to perform Level 3 filtering. If an unknown packet type is received from the external network, then the packet preferably is junked if filtering is enabled. Unknown packet types received from the internal network preferably are forwarded to other hosts on the internal network and may be forwarded to the bastion port but are not forwarded to the external network.

If it is a known packet type, then it is routed through additional filtering steps based on particular packet protocols.

In the illustrated embodiment, at step 66, if the packet is an Address Resolution Protocol (ARP) type packet, then it is passed. At step 68, if the packet is a Reverse Address Resolution Protocol (RARP) type packet and is from external PHY 12 and the op code is 3, then it is junked; otherwise, it is passed as indicated at step 70. As is known in the art, RARP generally is a protocol used by diskless workstations to determine their address; in accordance with preferred embodiments, RARP responses are the only RARP packets allowed to enter internal networks from external hosts. At step 72, if the packet is an Internet Protocol (IP) type packet, is from the external PHY and has been broadcast, then it is junked. (For example, broadcast packets from the external network preferably are not allowed; a broadcast packet is determined by examining the IP address or the physical layer address). Otherwise, the process proceeds to step 74. Step 74 preferably examines the IP header, which contains a protocol fragment where an application can place handling options. Certain options (such as the illustrated list) may be considered to provide internal, potentially sensitive network information, and thus packets that contain these options preferably are not allowed into the internal network. At step 74, if a handling option of 7, 68, 131, or 137 is present, then the packet is junked; if these options are not present, then the process proceeds to filter IP packet step 76 (exemplary details of step 76 are explained in greater detail hereinafter). If the packet passes the filtering rules applied in filter IP packet step 76, then the packet is passed, as indicated by step 78. If the packet does not pass the filtering rules applied in filter IP packet step 76, then the packet is junked.

As illustrated in FIG. 4, any signals indicating that the packet should be junked are provided to result aggregator 24, as indicated by line 73. The filtering results are thus routed to result aggregator 24, which records whether any of the packets were junked and thus invalidated. Result aggregator 24 provides one or more signals to the logic of block 60 at a time early enough so that a Frame Check Sequence (FCS) character may be altered to effectively invalidate the packet. Therefore, prior to complete forwarding of the packet, the filtering decision is made and the FCS character is either altered in order to ensure that it is corrupted, if the packet is to be junked, or forwarded unchanged, if the packet is to be passed. In effect, a system in accordance with the present invention acts like a hub or repeater by receiving packet nibbles (2 or 4 bits at a time) on one interface wire and by broadcasting those nibbles on other interfaces. Thus, the data protection system cannot make a decision about a packet before forwarding the nibbles on the non-receiving interfaces since this may result in an inoperable Ethernet network. If the system is enabled to filter a packet, it must still transmit data while receiving data to ensure the Ethernet network functions correctly and efficiently. The data protection system filters packets by transmitting a nibble on the non-receiving interfaces for each collected nibble on the receiving interface, but ensures that the Ethernet packet FCS character is not correct if the packet is suspect. Thus, the sending station may perceive that it successfully transmitted the packet without collision, but in fact all receiving stations will discard the corrupted packet. It should be noted that, in alternative embodiments, in lieu of or in addition to the selective alteration of a FCS or checksum-type value, the data contents of the packet also may be selectively corrupted in order to invalidate packets. In such embodiments, the packet contents are selectively altered to corrupt the packet (e.g., ensure that the checksum is not correct for the forwarded packet data or that the data is otherwise corrupted) if the packet did not pass the filtering rules.

FIG. 4 also illustrates physical switch or toggle 62, the state of which can be used to enable or control packet filtering in accordance with the present invention. The state of switch/toggle 62 is coupled to the data protection system in a manner to enable or disable packet filtering. In the illustrated example, the state of switch/toggle 62 is coupled to the logic of block 60; if, for example, packet filtering is disabled, then block 60 can receive and forward packets while disregarding the output of result aggregator 24 (alternatively, result aggregator 24 can be controlled to always indicate that the packet should not be invalidated, etc.). In other embodiments, the state of such a switch/toggle can control result aggregator 24 or all or part of the particular filtering steps. As will be appreciated in accordance with the present invention, the data protection system may be controlled and configured without requiring the implementation of complex software. The data protection system preferably utilizes toggle buttons or other physical switches to selectively enable various functions, such as Internet client applications, Internet server applications, and filtering features. The system, for example, also may contain a button for retrieving updated core logic or filtering rules from a data source. The data source for such updating of the core logic may include a wide range of forms of digital media, including but not limited to a network server, a floppy disk, hard drive, CD, ZIP disk, and DVD. Configuration, therefore, may be determined by physical interface components attached or linked to the system.

Figure 5:
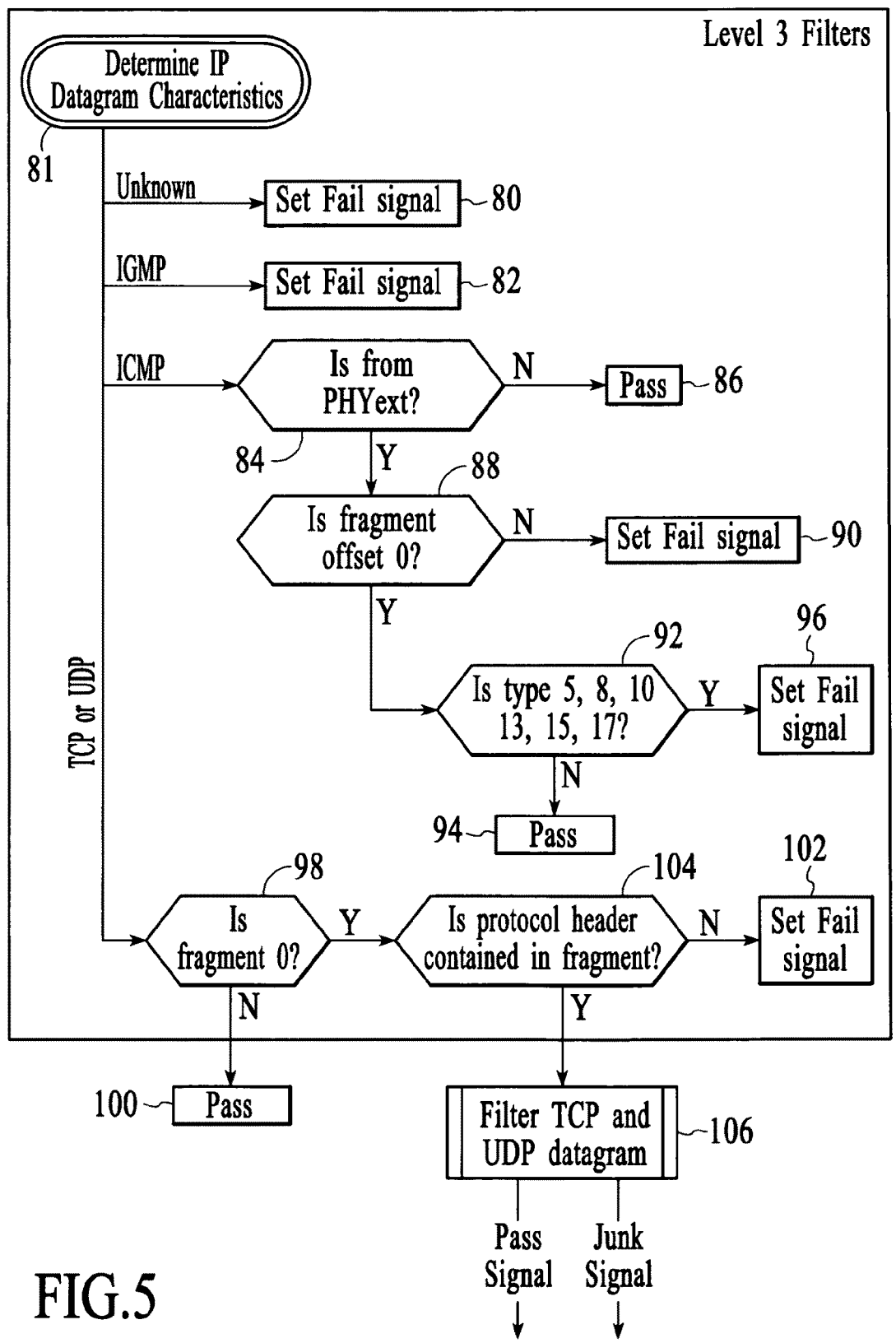
FIG. 5 is a flow chart illustrating packet filtering functions of Level 3 filters in accordance with preferred embodiments of the present invention.

Referring to FIG. 5, additional details of preferred filter IP packet step 76 will now be described. FIG. 5 is a flow chart illustrating the packet filtering functions of the Level 3 filters first illustrated in FIG. 3. At step 81, the Level 3 filtering processes determine the IP datagram characteristics, which preferably include: datagram type (ICMP, IGMP, TCP, UDP, unknown); source and destination IP addresses; fragment offset; and fragment size. Based on the IP datagram characteristics, further filtering operations are performed. Preferred functions for Level 3 filtering will now be described in greater detail.

At step 80, if the IP datagram type is unknown, then the fail signal is set, sending a signal to the result aggregator that the packet should be invalidated. At step 82, if the IP datagram type is Internet Group Management Protocol (IGMP), then the fail signal is set, preventing IGMP packets from passing. At step 84, if the type is Internet Control Message Protocol (ICMP) and the packet is from the external PHY, then the filtering proceeds to step 88. At step 84, if the type is ICMP and the packet is not from the external PHY, then the packet is passed as indicated by step 86. At step 88, if the type is ICMP, and the packet is from the external PHY and does not contain a fragment offset of 0, then the fail signal is set, preventing fragmented ICMP packets from passing, as indicated by step 90; otherwise, the filtering proceeds to step 92. At step 92, if the type is ICMP, the packet is from the external PHY and contains a fragment offset of 0, then the packet type is further evaluated for request and exchange data. This data preferably includes one of the following ICMP message types: 5 for redirect; 8 for echo request; 10 for router solicitation; 13 for timestamp request; 15 for information request; or 17 for address mask request. Accordingly, if the packet type satisfies the criteria for step 92, then the fail signal is set as indicated by step 96. Otherwise, the packet is allowed to pass, as indicated by step 94. As will be appreciated, the ICMP filtering branch serves to keep potentially harmful ICMP packets from entering from the external network. (The listed message types represent an exemplary set of ICMP packets that may expose the internal network topology to threats or cause routing table changes.)

If IP datagram characteristics indicate that the packet is a Transmission Control Protocol (TCP) or User Datagram Protocol (UDP) packet, then the filtering proceeds to step 98. At step 98, it is determined whether the packet is a fragment 0 packet. If it is not, then the packet is allowed to pass, as indicated by step 100. This filtering process follows the convention of filtering only the first fragments, as subsequent fragments will be discarded if the first one is not allowed to pass; in other words, the data protection system ignores all but the first packet of a TCP or UDP datagram. At step 104, if the packet is TCP or UDP and is a first fragment packet, then it is determined whether a proper protocol header is included in the fragment; if it is not, then the fail signal is set as indicated by step 102 (in the illustrated embodiment all TCP and UDP packets that have improper headers are junked). If the packet is TCP or UDP, is a first fragment, and a proper protocol header is included in the packet, then the filtering proceeds to step 106 (further exemplary details of which will be described in connection with FIG. 6).

Figure 6:
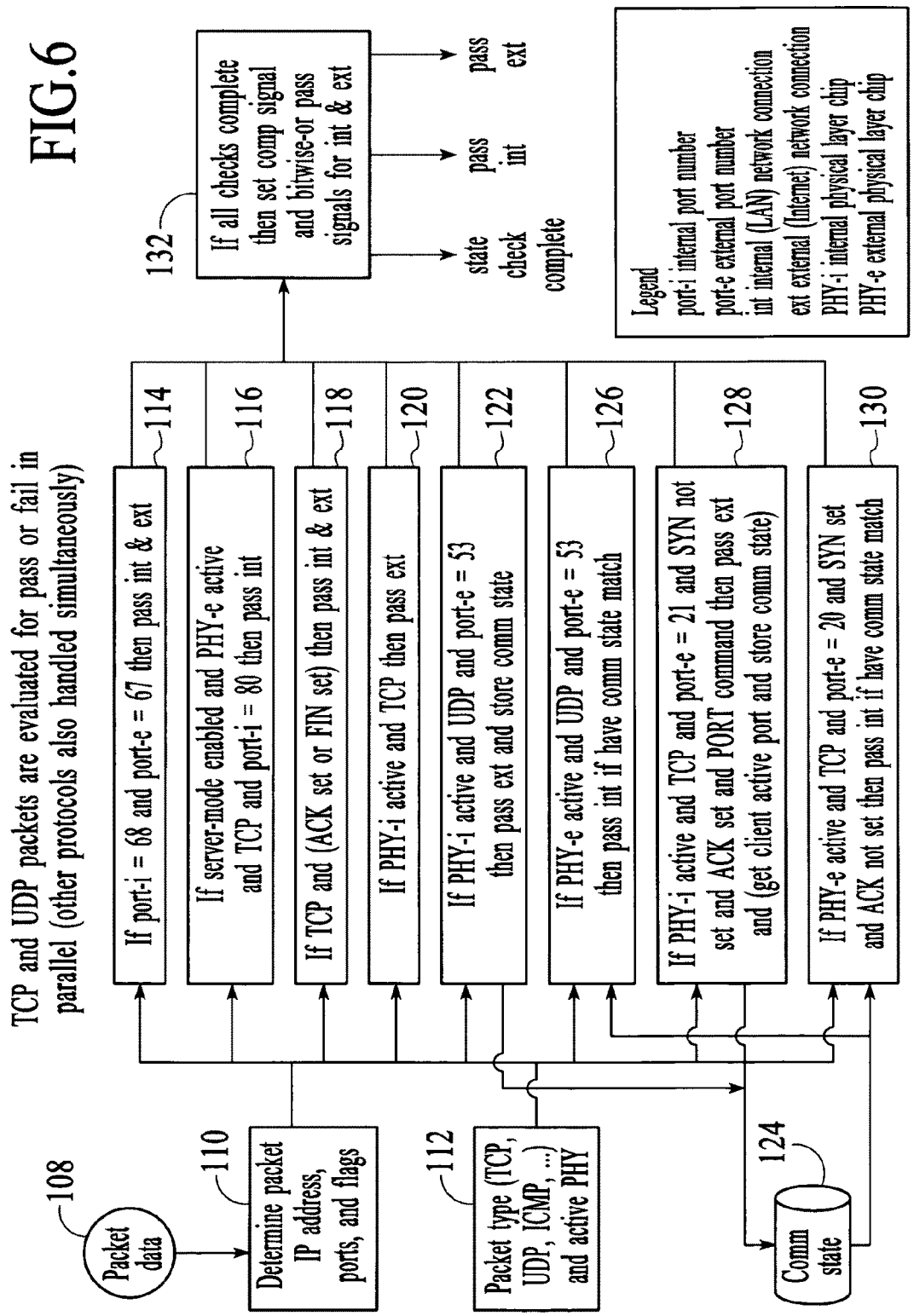
FIG. 6 illustrates the rules by which TCP and UDP packets are evaluated in parallel in accordance with preferred embodiments of the present invention.

FIG. 6 is a flow chart that illustrates a preferred example of how TCP and UDP packets are evaluated in parallel in accordance with the present invention (see, e.g., the multiple rules engines and related discussion in connection with FIG. 2 and the Level 4 filters of FIG. 3). As is known, TCP and UDP are host-to-host protocols located in the Transport Layer of the protocol stack. FIG. 6 illustrates how packet data 108 is unbundled and decoded for packet characteristics at step 110 (e.g., IP addresses, ports, flags, etc.) as well as for packet type and PHY activity at 112 (i.e., whether it is an internally generated packet or an externally generated one). In the preferred embodiments, the packets are evaluated in parallel according to the following rules.

As indicated at step 114, if the internal port number is 68 and the external port number is 67, then the packet is passed, regardless of whether it originated on the internal network or the external network. As indicated at step 116, if the packet type is TCP, the server-mode is enabled (such as may be controlled by a toggle or other physical switch), the external PHY is active, and the internal port number is 80, then the packet is passed to the internal network(s). (The server mode is explained in greater detail in connection with FIG. 7 below). As indicated at step 118, if the packet type is TCP and either the Acknowledge ("ACK") bit or Final ("FIN") bit is set, then the packet is passed, regardless of whether it originated on the internal network or the external network. As indicated at step 120, if the packet type is TCP and an internal PHY is active, then the packet is passed to the external network. As indicated at step 122, if the packet type is UDP, an internal PHY is active, and the external port number is 53, then the packet is passed to the external network and the communication state (e.g., source and destination port numbers) is stored as indicated by comm or communication state store 124. As indicated at step 126, if the packet type is UDP, the external PHY is active and the external port number is 53, then the packet is passed to the internal network(s) if there is a match in the communication state. As indicated at step 128, if the packet type is TCP, an internal PHY is active, the external port number is 21, the Synchronize Sequence Numbers ("SYN") bit is not set but the ACK bit is set, and the packet is a PORT command, then the packet is passed to the external network and the client (internal network) active port is determined and the communication state is stored. As indicated at step 130, if the packet type is TCP, the external PHY is active, the external port number is 20, and the SYN bit is set but the ACK bit is not set, then the packet is passed to the internal network(s) if there is a communication state match. As indicated at step 132, if all checks have been completed, then a complete signal is set, and signals indicative of whether the packet passes to internal or external network(s) as previously described are bitwise logically ORed to generate pass internal and pass external signals, as illustrated.

In preferred embodiments, if the completion signal is not generated by the time that the packet has been completely received, then the packet is junked. It should be noted that the use of such a completion signal and packet junking can be extended to the diagrams and description, etc. of other figures, such as FIGS. 2, 3, 4, 5, 7 and 8. If the filtering process has not been completed by the time that the packet has been completely received, then the packet is preferably junked.

Figure 7:
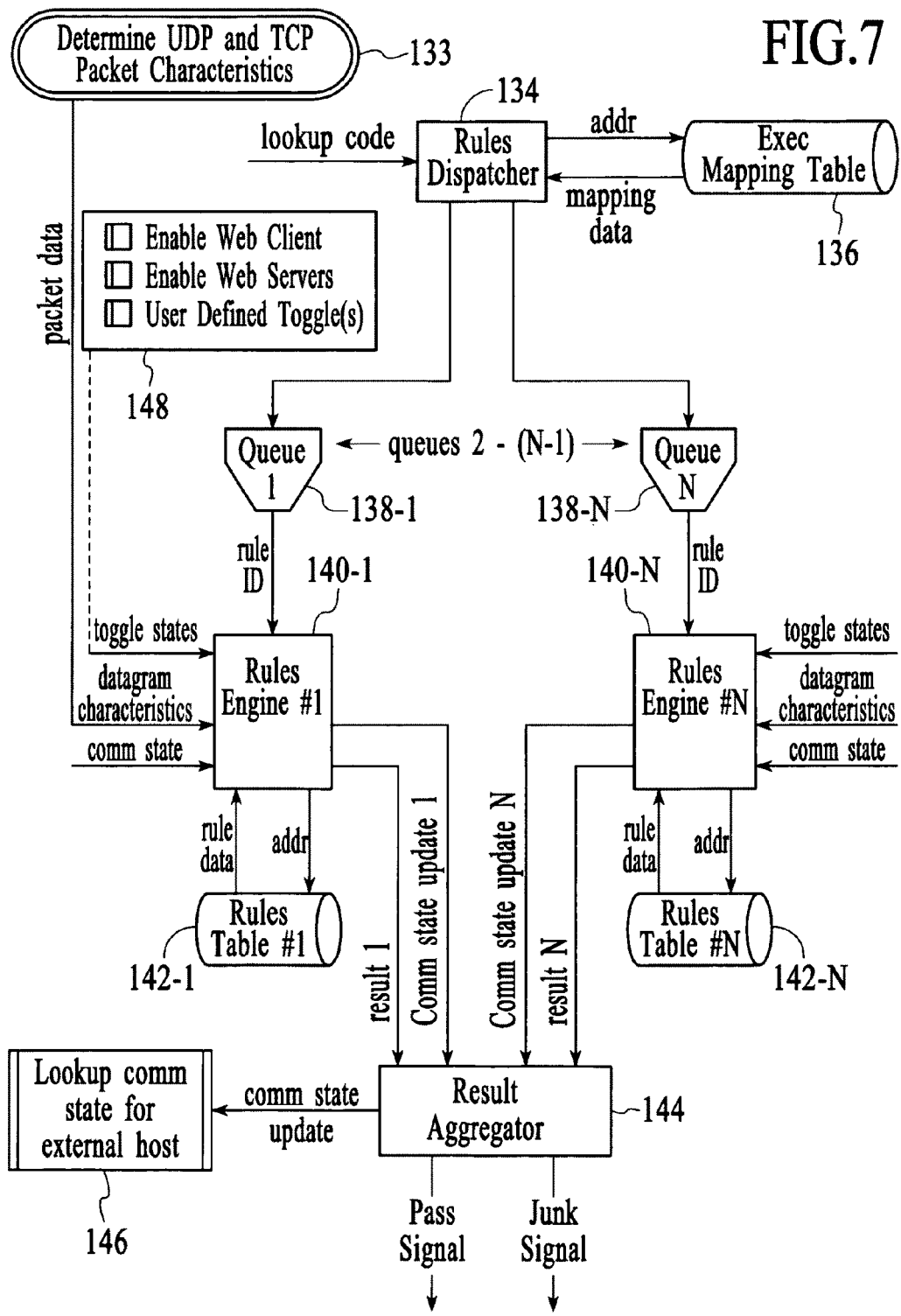
FIG. 7 is a diagram illustrating parallel rule evaluation for TCP and UDP packets in accordance with preferred embodiments of the present invention.

Referring now to FIG. 7, Level 4 filtering in accordance with the present invention will be further described. The embodiment of FIG. 7 is a table-based filter, which uses an approach similar to that described in connection with FIG. 2. This approach preferably utilizes a programmable logic device (PLD) that includes low latency, high-speed ROM and RAM blocks.

As previously described, Level 4 filtering is based on TCP and UDP packet characteristics, the determination of which is illustrated in FIG. 7 by block 133. TCP and UDP characteristics, as noted elsewhere herein, may include not only source and destination port numbers, but also the state of the SYN, ACK, FIN and/or RESET flags in the case of TCP packets. The TCP/UDP characteristics are determined by the TCP/UDP header information. The TCP/UDP characteristics and active PHY information are used in the generation of a lookup code, which in the embodiment of FIG. 7 is coupled to rules dispatcher 134. Rules dispatcher 134 uses a lookup code to determine the filtering rules to be applied to a packet and then places the identifiers of the rules to be run in queues 138-1 to 138-N for each of the rules engines 140-1 to 140-N. Mapping table 136 is coupled to and receives address data from rules dispatcher 134. Mapping table 136 preferably is a ROM block that identifies the rules associated with each lookup code and the rules engine for which each rule is to be dispatched. The mapping data for the rules and rules engines are returned to rules dispatcher 134.

The identifiers of the rules to be run are dispatched by rules dispatcher 134 to the appropriate queues 138-1 to 138-N, which are preferably FIFO-type structures that hold the rule identifiers for corresponding rules engines 140-1 to 140-N. Queues 138-1 to 138-N not only enable rules dispatcher 134 to assign rules at maximum speed, but also allow each rules engine to retrieve rules as each one is evaluated. The rules engines 140-1 to 140-N are a plurality of filtering engines/logic that use a rule table to read a definition specifying whether a rule applies to a packet and whether the packet passes or fails the rule test. Rules tables 142-1 to 142-N preferably are ROM blocks that contain a definition of a set of filtering rules that are controllably run by the rules engines 140-1 to 140-N. Rules tables 142-1 to 142-N may contain different rules as may be appropriate to provide all of the rules necessary to adequately filter packets within the timing constraints imposed by the real time filtering of the present invention, and the speed of the hardware used to implement the data protection system.

In addition, as illustrated in FIG. 7, rules engines 140-1 to 140-N may receive as inputs signals indicative of a stored communication state, IP datagram characteristics, or physical switch/toggle states. As indicated by block 148, toggles may be utilized for a variety of features, such as enabling web client, web servers or other user-defined features. With at least some of the executed rules based on the stored communication state, stateful rules are implemented with the illustrated embodiment. A communication state table or cache is provided. A cache of communication state information between different hosts provides a set of bits that represent rule defined state information. For example, source and destination port information may be stored in the cache and used for state-dependent filtering.

In the illustrated embodiment, communication state information from rules engines 140-1 to 140-N may be provided to result aggregator 144, which in turn may store the communication state information to the communication state cache or storage area. Result signals, representing pass or fail of the packet based on the applied rules, also are provided to result aggregator 144. Result aggregator 144 combines the pass/fail results signals and provides a pass or junk signal or signals, which may be provided to the repeater core or to another result aggregator.

Figure 8:
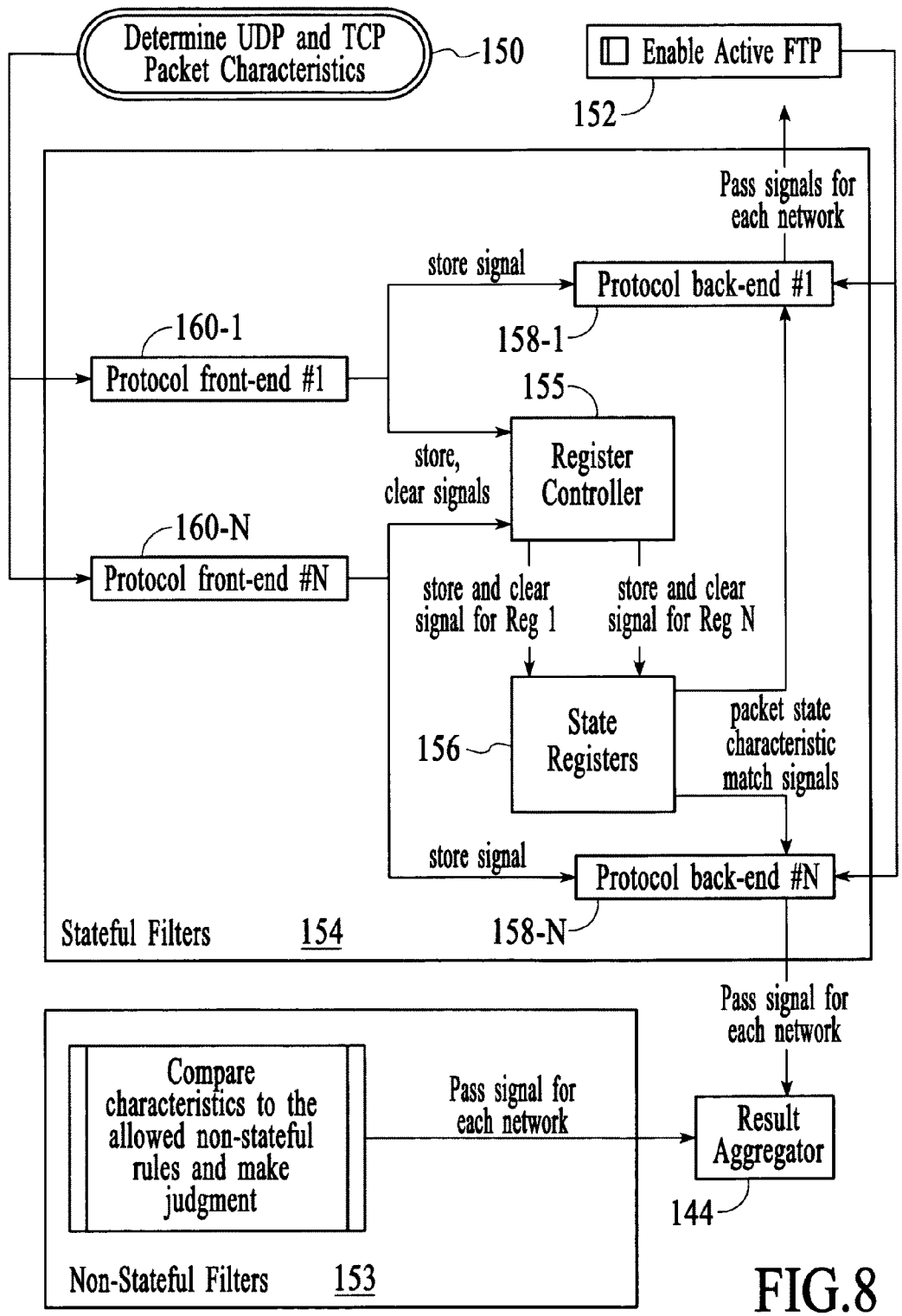
FIG. 8 is a flow chart illustrating packet filtering functions of Level 4 filters in accordance with preferred embodiments of the present invention.

FIG. 8 illustrates an alternative preferred embodiment, in which the Level 4 filtering is implemented with a register-based filtering methodology. As with the Level 4 filtering of FIG. 7, both stateful filters 154 and non-stateful filters 153 may be implemented. As with the embodiment of FIG. 7, Level 4 filtering requires that TCP and UDP packet characteristics be determined, as illustrated by box 150. In addition to the Level 3 packet characteristics, Level 4 filters in accordance with this embodiment also require the source and destination port numbers and the TCP header values for the SYN, RST, FIN flags and the ACK value. This information preferably is used by both non-stateful and stateful filters 153 and 154. The implementation of the non-stateful filters is executed with a state machine or other logic preferably in the PLD that compares characteristics to the allowed non-stateful rules and makes a judgement as to whether the packet should be passed or failed. The non-stateful rules engine/logic uses a set of static rules to decide if a packet is allowed to pass through the firewall. These rules preferably are specified using a combination of control inputs, active PHY, and network packet characteristics.

Stateful filters are implemented to handle communication channel interactions that span multiple transmissions between hosts. The interactions typically occur at the Application Layer of the protocol stack, where examples may include FTP, RealAudio, and DHCP. These interactions may also take place at lower levels in the protocol stack, such as ARP and ICMP request/response.

In this embodiment, stateful filters 154 use protocol front-end and protocol back-end logic, along with a plurality of state registers to implement state-dependent filters. Each protocol that requires stateful packet filtering preferably has protocol handlers in the form of front-end and back-end logic, which decide when to issue a pass signal for a packet or store the identifying characteristics of a bitstream for later reference. Front-end logic 160-1 to 160-N monitors the network traffic to identify when the current communication state needs to be stored, deleted or updated. Front-end logic 160-1 to 160-N informs a corresponding back-end logic 158-1 to 158-N that a register will be allocated for storage for a bitstream. All store and delete state register requests are sent to back-end logic 158-1 to 158-N so it may update its internal information. Register controller 155 controls the actual selection of registers in state registers 156 and informs the corresponding back-end logic 158-1 to 158-N. Back-end logic 158-1 to 158-N monitors which state registers are dedicated to its protocol and issues a pass signal for packets that match an existing bitstream, as indicated by the appropriate packet characteristics and a matching state register. It should be noted that in alternate embodiments, different organizations of the functions of the programmable logic may be implemented in accordance with the present invention, incorporating various types of protocol handlers and state registers, as may be necessary.

Register controller 155 consolidates multiple store and clear signals from the various front-end logic 160-1 to 160-N and directs them to the appropriate registers in state registers 156. Register controller 155 also informs the various back-end logic 158-1 to 158-N which registers of state registers 156 are to be used for storage. The registers of state registers 156, under control of register controller 155, store the communication state of a bitstream; for example, a particular register records information about the two communication ends of the bitstream and also monitors each network packet to see if it matches the stored end-point characteristics. State registers 156 then sets a signal when its state matches the current packet characteristics. A "garbage collection" function also is implemented (as further illustrated in FIG. 13 below) to help free up state registers when the protocol information during the three-way handshake is not accessed within specific time frames.

As is known in the art, many protocols provide a way of identifying the end of a communication session. Accordingly, in preferred embodiments the data protection system detects when a stateful stream ends and frees up the associated state registers. Since clients and servers do not always cleanly terminate a communication session, the system preferably implements session time-outs to free state registers after a period of bitstream activity and to prevent indefinite state register exhaustion. If the network experiences a high rate of bitstreams requiring stateful inspections, the system's resources, which are allocated to tracking application data, can become exhausted. In this case, the system preferably resorts to allowing network traffic based on a set of static rules to pass through the non-stateful rules designed specifically for each protocol. This stateful to non-stateful transition is called "stateful relaxation." To maintain maximum security, a protocol handler that cannot gain access to an open state register will free up all of its state registers to help prevent other protocol handlers from entering into a relaxation state. The system will then wait for a state register to open, start a timer, and record protocol communication data in the state registers, while relying on the static rules. When the timer expires, the state filter will cease relying upon the static rules and approve packets solely on state register information.

FIG. 8 also illustrates toggle 152, which, in the additional illustrated example, selectively enables FTP (File Transfer Protocol) communications based on the switch state. Protocol back-end logic 158-1 to 158-N, as appropriate, utilize such toggle state information to selectively generate the pass/fail signals for the applicable protocols. For example, when the toggle switch is enabled, which is the default mode in most FTP client applications, it may send a signal to the internal FTP server to open a TCP connection to the client. Front-end logic 160-1 monitors the network traffic for data from the internal network, PORT command, source port number (greater than 1024) and destination port number (equal to 21). When this information is matched, front-end logic 160-1 requests state register controller 155 to store both the PORT command IP address and the port number as the destination end and the destination IP address, as well as store port 20 as the source end of a future communication packet. (In other embodiments, additional checks may be conducted to ensure the active connection IP address is the same as the current source IP address.) When back-end logic 158-1 recognizes the storage request, it waits for the allocated state register in state registers 156 to be sent by register controller 155. For example, when the state register number is set as register #1, then it records that register #1 is dedicated to allowing active FTP connections through the data protection system. Back-end logic 158-1 then waits for register #1 to signify that the current packet matches its stored state. When back-end logic 158-1 recognizes that the three-way TCP handshake has been completed for the new connection, it will notify front-end logic 160-1 to delete the state register. If the state register is junked, then back-end logic 158-1 records that register #1 is no longer dedicated to active FTP connections, allowing register controller 155 to allocate that register to a different protocol or network connection in the future.

Figure 9:
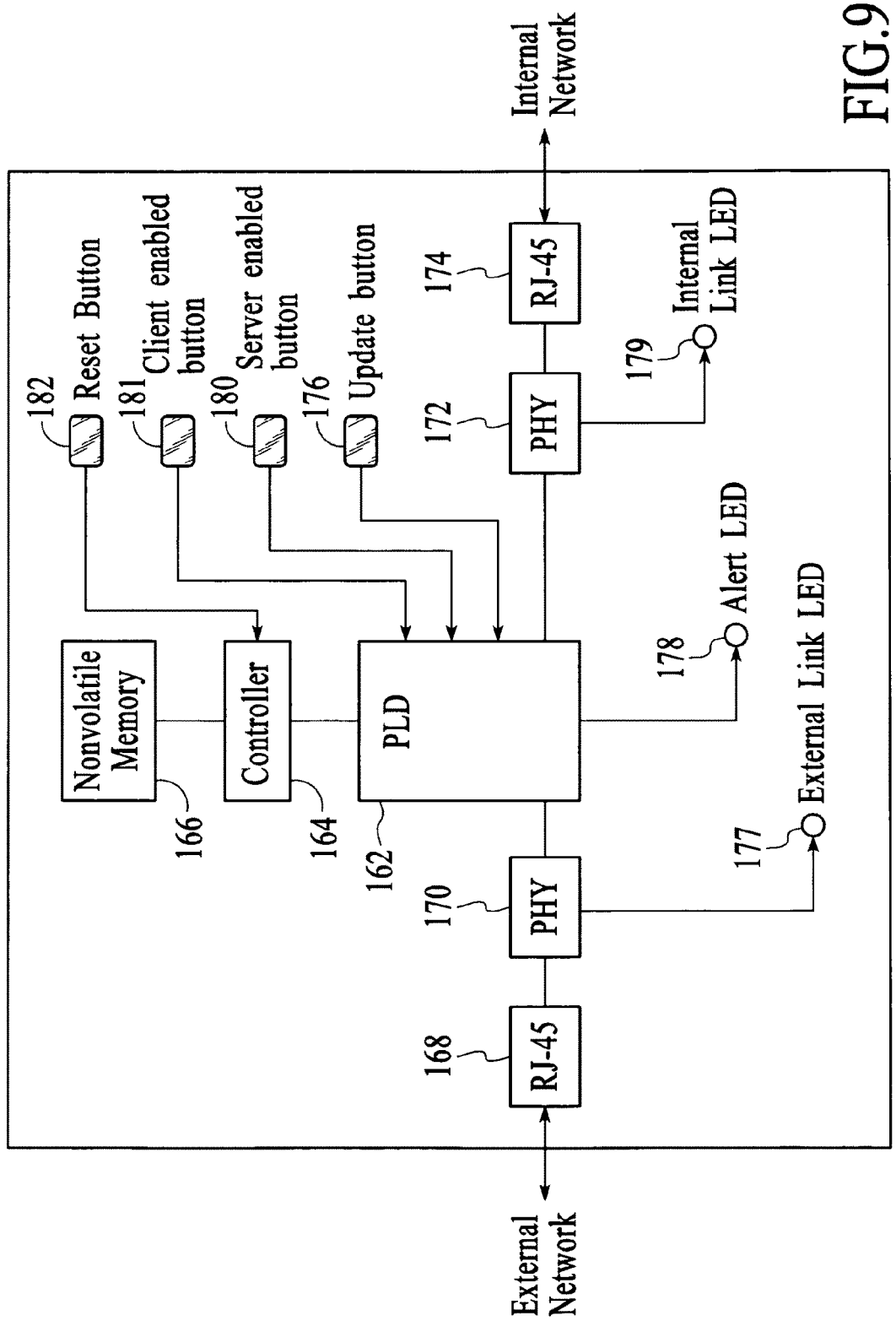
FIG. 9 is a block diagram of the hardware components of a preferred embodiment of the present invention.

FIG. 9 illustrates a preferred physical implementation of one embodiment of the present invention. In this embodiment, one external network connection and one internal network connection are provided. It will be appreciated that the components of FIG. 9 can be altered to implement, for example, bastion network connections and multiple internal network connections, etc.

The Internet connection, for example, via a cable modem, DSL router or other network interface, preferably is coupled with a physical cable to connector 168, which may be an RJ-45 connector. The signals received via connector 168 are coupled to and from PHY 170, which provides the physical interface for the data signals received from, or coupled to, the external network. Signals are coupled between PHY 170 and PLD 162, and signals are coupled between PLD 162 and PHY 172, which couples signals between connector 174 (which again may be an RJ-45 connector). The connection to the internal network may be made through connector 174.

In the preferred embodiment, PLD 162 implements the various levels of filtering as previously described. PLD 162 provides logic/hardware based, parallel filtering rules logic/engines, which make a decision about whether the packet should be allowed to pass or fail prior to the time that the packet is passed on by the repeater core portion of PLD 162 (as described elsewhere herein). The logic of PLD 162 to implement the filtering rules is programmed/loaded by controller 164, which may be a RISC CPU such as a MIPS, ARM, SuperH-type RISC microprocessor or the like. The PLD code preferably is stored in memory 166, which preferably is a re-programmable, non-volatile memory, such as FLASH or EEPROM. In this manner, the PLD code may be updated by reprogramming memory 166, and the updated PLD code may then be programmed/loaded in to PLD 162 under control of processor 164.

FIG. 9 also illustrates the use of LEDs 177, 178 and 179 to provide visual feedback of the data protection system status. In accordance with the present invention, the use of such displays or light sources may be used to convey various types of information to the user. For example, LEDs 177 and 179 may be provided to indicate that PHYs 170 and 172 are detecting an active network connection (and thus provide an indication that the network connections are present and functioning properly). LED 178 preferably provides alarm type information. For example, LED 178 may be provided in the form of a multi-color LED, which may provide a first colored light (e.g., yellow) if the data protection system has rejected one or more packets (thereby indicating that the system may be detecting an attack), and which may provide a second colored light (e.g., red) if the data protection system is continually rejecting packets or rejecting packets at a high rate (thereby indicating that the system is likely under attack). Such visual indicators, which may be coupled with audio feedback as described elsewhere herein, serve to inform the user that the user's computer or network may be under attack, thereby enabling the user to take further action, such as disconnecting from the network.

It should be noted that such visual feedback may be implemented in a variety of forms. In addition to multi-color or multiple LEDs or other lights sources or displays, a single LED could be provided, with the LED blinking at a rate that indicates the level of severity as predicted by the data protection system. For example, if no packets have been rejected, then the LED may be in an off or safe (e.g., green) state. If packets have been rejected but not on a continual or high rate basis, then the LED (e.g., red) may be controlled to blink on and off at a first, preferably lower speed rate. If packets are being rejected on a continual or high rate basis (or otherwise in a manner that that system believes is suspect), then the LED may be controlled to blink on and off at a second, preferably higher speed rate. Thus, the LED blink rate desirably may be controlled to blink at a rate that corresponds to the level of severity of the security threat that is determined by the data protection system. Optionally coupled with audio feedback, such visual indicators may provide the user with alarm and status information in a simple and intuitive manner.

As further illustrated in the preferred embodiments of FIG. 9, a variety of physical switches or toggles 176, 180, 181 and 182 may be coupled to PLD 162 or controller 164. As illustrated by update button 176, toggles may be used to control the updating of the PLD code (for instance, to reconfigure or update the system, providing updated filtering algorithms). As illustrated by buttons 180 and 181, toggles may be used to selectively activate/deactivate filtering steps depending on whether a protected computer is enabled to operate in either a server mode or client mode (the state of such toggles preferably being used to control filtering decisions made within the filtering logic). As illustrated by reset button 182, toggles may also be used to control the reset of the data protection system (for example, to cause the PLD code to be re-loaded, as when the system enters an inoperable state caused by power supply irregularities or other unusual circumstances). The use of such physical switches/toggles allows the data protection system to be controlled in a straightforward manner, simplifying the user operability of embodiments of the present invention.

With reference to FIG. 9, additional details of preferred update program and protocols will now be described. The data protection system may be controlled to operate in an update mode by pressing update button or toggle 176, which preferably is provided on an external case (further described in FIG. 10 below). In accordance with preferred embodiments, during the interval when the update button is pressed by the user and the update either completes or is canceled by the user, the data protection system will not forward any packets (i.e., filtering is not active, so packet transmission is blocked). The user may then run an update program (which may be a browser-based or stand-alone application) from an internal host computer.

In the illustrated embodiment, it is assumed that the user previously downloaded a system update or is downloading an update through a browser. The update program preferably breaks the update into 1K size packets and forwards them, using a limited broadcast destination address (for example, 255.255.255.255). The source and destination ports are set to a predetermined value, such as 1 (1-4 are currently unassigned according to RFC 1010), and an IP option is set in the IP header. The program data preferably is preceded by the system update header that has the following structure in the illustrated embodiment: ID (1)/count (1)/bit length (2). The numbers in parentheses represent the field size in bytes. The ID for the entire transaction remains unchanged, except for the count field increments for each packet. In a preferred embodiment, the data protection system may receive the packets in order and perform several checks, such as ensuring the ID and count fields are correct, verifying the UDP checksum, and storing the configuration data in non-volatile memory. Preferably, these checks may be controlled by controller 164. Thereafter, the updated PLD code may be loaded into the PLD, with the filtering operations being based on this updated code.

As a result of the parallel filter rules evaluation as previously described, packets do not need to be buffered, except, for example, to create octets that facilitate determining protocol elements. (As is known, data needs to be combined into 8-bit, 16-bit, or 32-bit words because header and packet data often exist in these sizes or straddle a 4-bit nibble boundary.) Instead of buffering each packet, the data protection system generates another distinct data packet or chunk. This process of packet generation occurs while a plurality of filtering rules are applied in real time and in parallel, producing improved data protection systems and methods.

Figure 10:
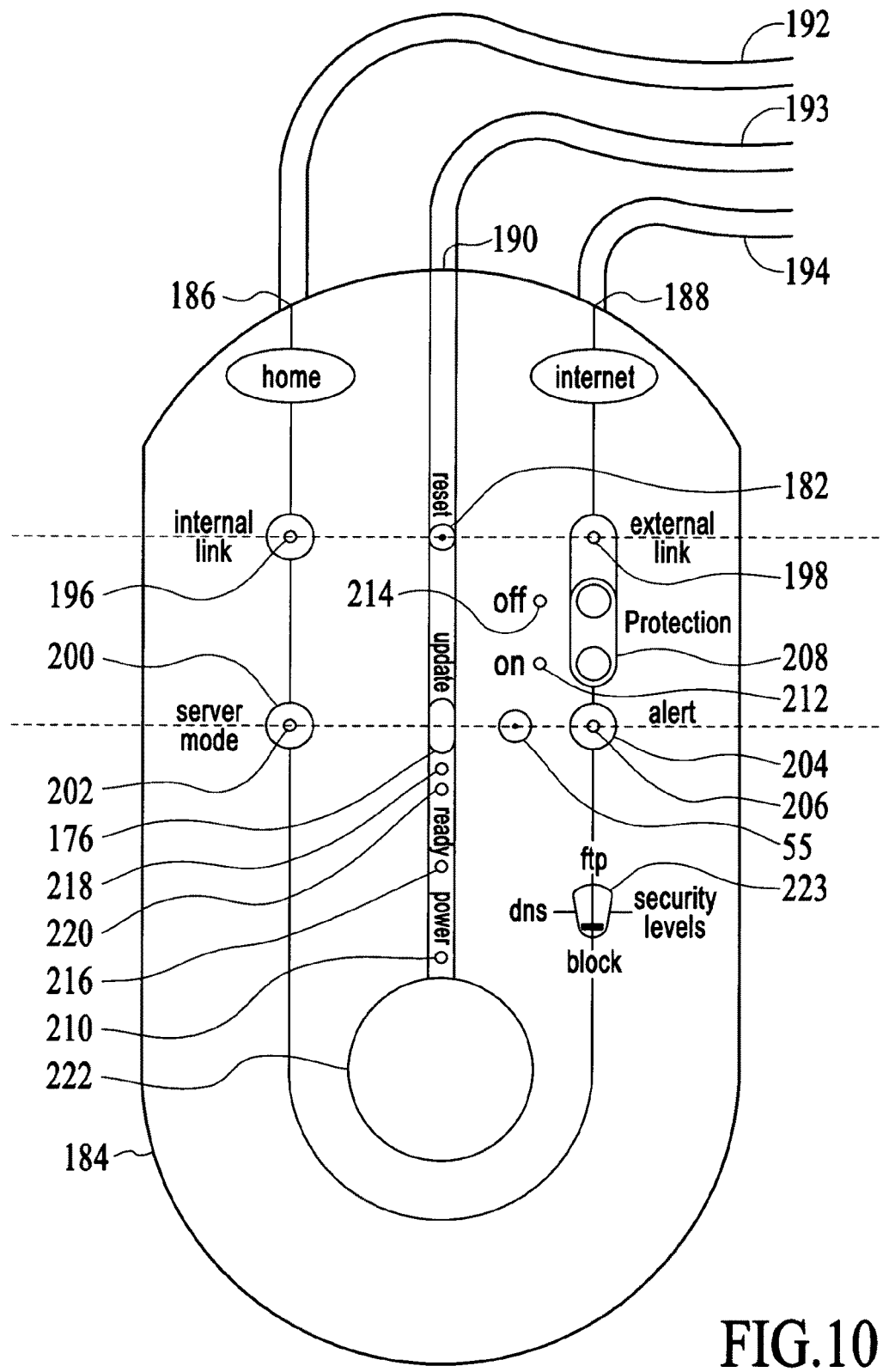
FIG. 10 is an illustration of an exemplary design of an external case in accordance with preferred embodiments of the present invention.

FIG. 10 illustrates a preferred embodiment of an exemplary design of an external case of a data protection system in accordance with the present invention (it being noted that the particular switches, lights, etc., and their physical arrangements being exemplary). For example, external case 184 may be a molded plastic box in the shape of a "U" or folded tube as illustrated. The exemplary features of this external case may include ports, buttons (or toggle switches), LEDs, a clock, a removable logo disk, and a power supply connector. Home (internal) port 186, Internet (external) port 188, and power supply connector 190 are preferably located on the same side of external case 184 with power supply connector 190 set between the two ports. Home port 186 connects to the internal network via cable 192; Internet port 188 connects to the external network via cable 194. Power supply connector 190 is coupled to an external DC power supply via cable 193. The PHY of each port preferably is coupled to a link LED, such as previously described: home port 186 is coupled to internal link LED 196; and Internet port 188 is coupled to external link LED 198. The link LEDs are thus coupled to the internal and external PHYs, respectively, and serve to indicate whether the PHYs have detected a network connection.

In the preferred embodiment, on the internal network side of the U-shaped case, server mode button 200 is provided to allow the user to selectively enable filtering depending on whether the internal computer is allowed to operate in a server mode (thus, the state of server mode button 200 may be used to selectively control filtering decisions based on whether internal computers will be operating in a server mode, etc.). Server mode button 200 preferably includes server mode LED 202. When illuminated (e.g., green), server mode LED 202 indicates that the internal computers are enabled to operate in a server mode and the filtering decisions will be controlled accordingly. Server mode button 200 and server mode LED 202 are coupled to PLD 162, as described in FIG. 9. In the illustrated embodiment, parallel to server mode button 200 on the external side of the case is alert button 204, which contains alert LED 206. Alert LED 206 is coupled to alarm controller 53, which preferably is implemented as a part of PLD 162 (as illustrated in FIGS. 3 and 9, respectively). Alert LED 206 may contain a single or multi-colored LED, which, when illuminated, indicates the data protection system is under attack and is rejecting suspect packets. The data protection system preferably registers the frequency of attacks and sends signals to alert LED 206 based on such information. In a preferred embodiment, alert LED 206 may contain a LED (e.g., red), which remains consistently illuminated during irregular attacks or blinks at regular intervals under heavy attack. In another preferred embodiment, alert LED 206 may contain a multi-colored LED, which similarly indicates when the system is under attack and is rejecting packets. However, with a multi-colored LED, the increase in frequency or intervals of attacks may be indicated by a change in color: for example, green (indicating no registered attacks by suspect packets) to yellow (indicating a few irregular attacks) to red (indicating more frequent attacks) to blinking red (indicating a heavy attack). The alert alarm may be reset by depresseing alert button 204.

In a preferred embodiment, speaker 55 or some form of audio transducer may be coupled to alarm controller 53 to also indicate the presence or severity of attacks (as described in connection with FIG. 3). For example, when the data protection system is under heavy attack and alert LED 206 is blinking (e.g., red), an alarm signal may be transmitted to speaker 55 to emit audio information to indicate a suspected severe attack or emergency. Alarm-type information may also be coupled to the internal network (such as via a UDP packet, as described elsewhere herein), and thus transmit alarm information over the network to a software interface on the desktop. In other embodiments of the data protection system, an array of different features, including buttons, LEDs, alarms, and graphical user interfaces, may be utilized to indicate the class, frequency and severity of attacks on the system.

Adjacent to alert button 204 on the external network side of the case preferably is protection button 208, which is coupled to protection-on LED 212 and protection-off LED 214. When protection button 208 is set in the "on" position, protection-on LED 212 preferably illuminates red and the filtering system is enabled; when protection button 208 is set in the "off" position, protection-off LED 214 preferably illuminates yellow and the filtering system is disabled. As will be appreciated, the particular colors utilized are exemplary.

Still referring to FIG. 10, power LED 210 is coupled in a manner to indicate power is being provided via power supply connector 190. When power LED 210 is illuminated (e.g., green), it indicates the power supply is providing power to the data protection system. It should be noted that in the illustrated embodiment, the present invention does not require an on/off switch for the power supply because the system is designed to be enabled once a DC power supply is provided. As previously described, reset button 182 is coupled to controller 164 and may be used to initiate loading or re-loading of the PLD code.

Adjacent to reset button 182 is update button 176, which is coupled to update-enabled LED 218 and update-disabled LED 220, as well as PLD 162 (as illustrated in FIG. 9). As previously described, an update program preferably is utilized to update the logic programming and rules tables. Preferably, after pressing update button 176, the data protection system is automatically restarted, causing the new PLD code to load. The load version bit preferably will be set in the flash configuration header, which causes the system to load using the new program file. In a preferred embodiment, update-enabled LED 218 will illuminate in green to indicate the data protection system is ready to receive the new updated programming. After the update begins, the system may continually flash update-enabled LED 218 until the successful completion of the update; LED 218 is extinguished upon successful completion of this process. However, if an update is incomplete and fails to occur, update-failed LED 220 may illuminate in red and blink. The user extinguishes LED 220 by pressing the update button a second time. If possible, the data protection system may generate a UDP packet to inform the internal client of the reason for the failure. As an additional example, if the system contains an LCD, it may display an error code. The data protection system will continue to filter packets after update-failure LED 220 is extinguished. LED 216 is preferably provided to be illuminated when the system is operating and filtering packets in the manner described. In addition to the various toggles in a preferred embodiment of the present invention, additional types of components may be used to enter filtering criteria and/or selectively enable or control the filtering, such as a LCD display coupled with input buttons, a touch screen, an audio input for speech recognition, and/or a clock. Thus, filtering decisions may be made based on such switch inputs, audio commands, time of day or date, etc.

As further illustrated in FIG. 10, a removable logo disk 222 may be located on a preferred embodiment of the case. This removable disk may include a company logo, registered trademark, and/or other copyrighted material that may be valuable for branding and marketing the data protection system under a separate wholesaler. The disk is thus removable and replaceable for a variety of branding purposes.

In an alternate embodiment, security levels switch 223 may be implemented to prevent stateful relaxation, in which a stateful to non-stateful transition may occur during state register exhaustion. As illustrated in FIG. 8, security levels switch 223 may preferably include a variety of features that prevent stateful relaxation, such as timers, protocol-specific filters, and other rules-based filters. For example, switch 223 may be configured for three positions: one which allows FTP protocols, but does not allow DNS protocols; another which allows DNS protocols, but does not allow FTP; and a third which may serve as an emergency back-up feature and block all network traffic.

In other embodiments, different designs may be used in accordance with the present invention, incorporating various buttons, switches, LEDs, ports, cables, slots, connectors, plug-ins, speakers, and other audio transducers, which in turn may be embodied in a variety of external case shapes, as may be necessary. As will be appreciated, the filtering criteria may be dependent upon physical switch position, packet characteristics, clock time, and/or user-specified criteria, all of which may be entered through one or more physical input device(s). Such a physical input device, for example, may be comprised of one or more switches (such as a toggle switch, button switch, or multi-state switch), an audio input device, or display input device. The user-specified criteria may be transferred from the configuration software to the system using a network protocol, infrared port, or cable attachment.

Figure 11:
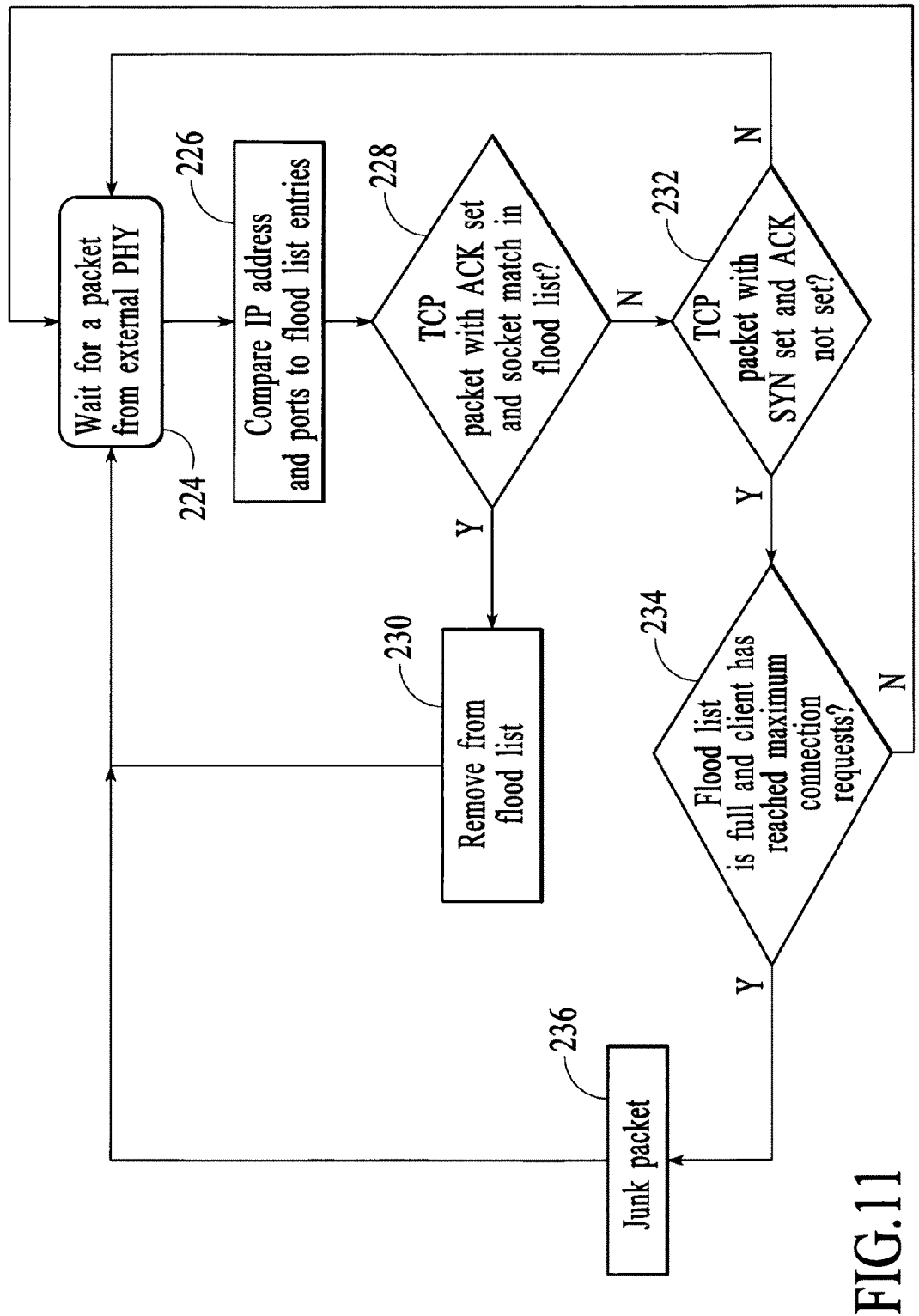
FIGS. 11 and 12 are flow diagrams illustrating SYN flood protection in accordance with preferred embodiments of the present invention.
Figure 12:
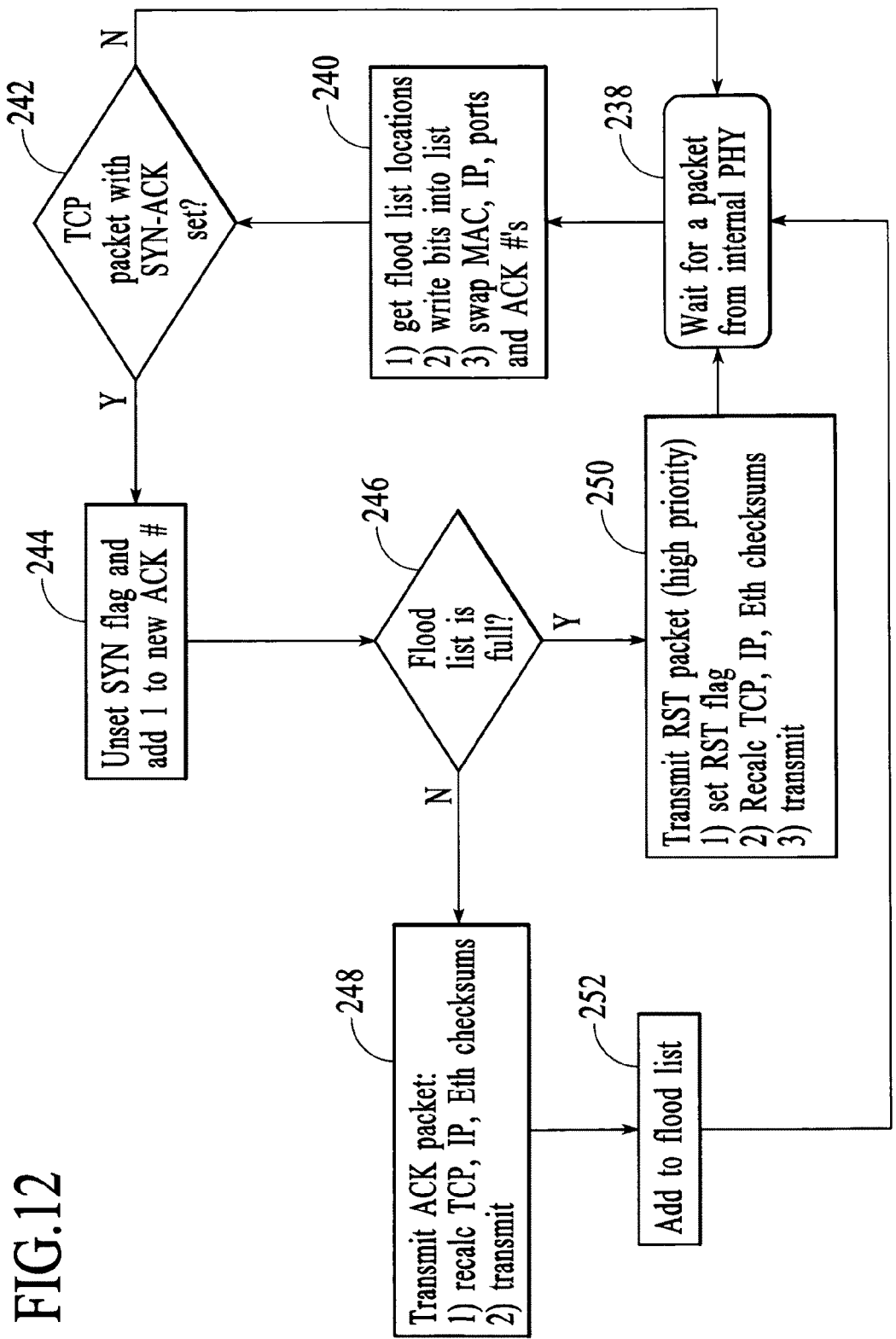

FIGS. 11 and 12 are flow diagrams illustrating examples of "SYN flood" protection in accordance with preferred embodiments of the present invention. Such SYN flood protection is optionally provided as an additional computer protection mechanism in accordance with certain preferred embodiments.

As is known in the art, SYN flood is a common type of "Denial of Service" attack, in which a target host is flooded with TCP connection requests. In the process of exchanging data in a three-way handshake, source addresses and source TCP ports of various connection request packets are random or missing. In a three-way handshake, the system registers a request from an IP address, then sends a response to that address based on its source, and waits for the reply from that address.

As illustrated in FIG. 11, the data protection system waits for a packet from external PHY 14 (as illustrated in FIG. 2) at step 224. When the system receives a packet from the external PHY, it compares the IP address and ports to the flood list entries at step 226, then proceeds to step 228. At step 228, the system determines whether the packet type is TCP, the ACK bit is set, and the packet matches an entry in the flood list. If these criteria are met, then the system proceeds to step 230, where the packet is removed from the flood list. If the packet is removed from the flood list, then the system returns to step 224 and waits for the next packet from the external PHY. Otherwise, if the criteria at step 228 are not met, then the system proceeds to step 232, where the system determines whether the packet type is TCP, the SYN bit is set and the ACK bit is not set. If the criteria at step 232 are met, then the system proceeds to step 234; otherwise, the system returns to step 224. At step 234, the system determines if the flood list is full and if the client has reached the maximum connection requests. If the flood list is not full, then the system returns to step 224 to wait for more packets from the external PHY. However, if the flood list is full at step 234, then the system proceeds to step 236, where the packet is junked and the system returns to step 224.

As illustrated in FIG. 12, the data protection system also waits for a packet from internal PHY 18 (as illustrated in FIG. 2) at step 238. When the system receives a packet from the internal PHY, it accesses the flood list location and writes the bits into the list, swapping ACK bits as well as MAC, IP and port addresses. The system then proceeds to step 242, where it determines if the packet type is TCP and the SYN and ACK bits are set. If the criteria at step 242 are met, then the system proceeds to step 244; if not, then the system returns to step 238 and waits for another packet from the internal PHY. At step 244, the SYN flag is unset and number 1 is added to the new ACK number. The system then proceeds to step 246, where it determines if the flood list is full. If the flood list at step 246 is full, then the Reset flag is set, the checksums for TCP, IP and Ethernet protocols are recalculated, and the Reset packet is transmitted. The system then returns to step 238. However, if the flood list at step 246 is not full, then the system proceeds to step 248, where the checksums for TCP, IP and Ethernet protocols are recalculated and the ACK packet is transmitted. The system then proceeds to step 252, where the recalculated packet is added to the flood list and the system returns to step 238, where it waits for another packet from the internal network.

In accordance with the present invention, SYN flood protection as described does not require either an IP or MAC address. The data protection system uses the destination MAC address as the source Ethernet address when framing the response packet that completes the TCP three-way handshake. In all cases, when forming the new packet, the source and destination header information is swapped, so that the source IP address and port become the destination IP address and port. It should be appreciated that SYN flood protection, as preferably implemented by the system, does not buffer the incoming packet, but builds the TCP response packet in real-time. The new TCP packet is placed in a queue for transmission at the earliest time possible based on the rules dictated by the link level protocol.

Figure 13:
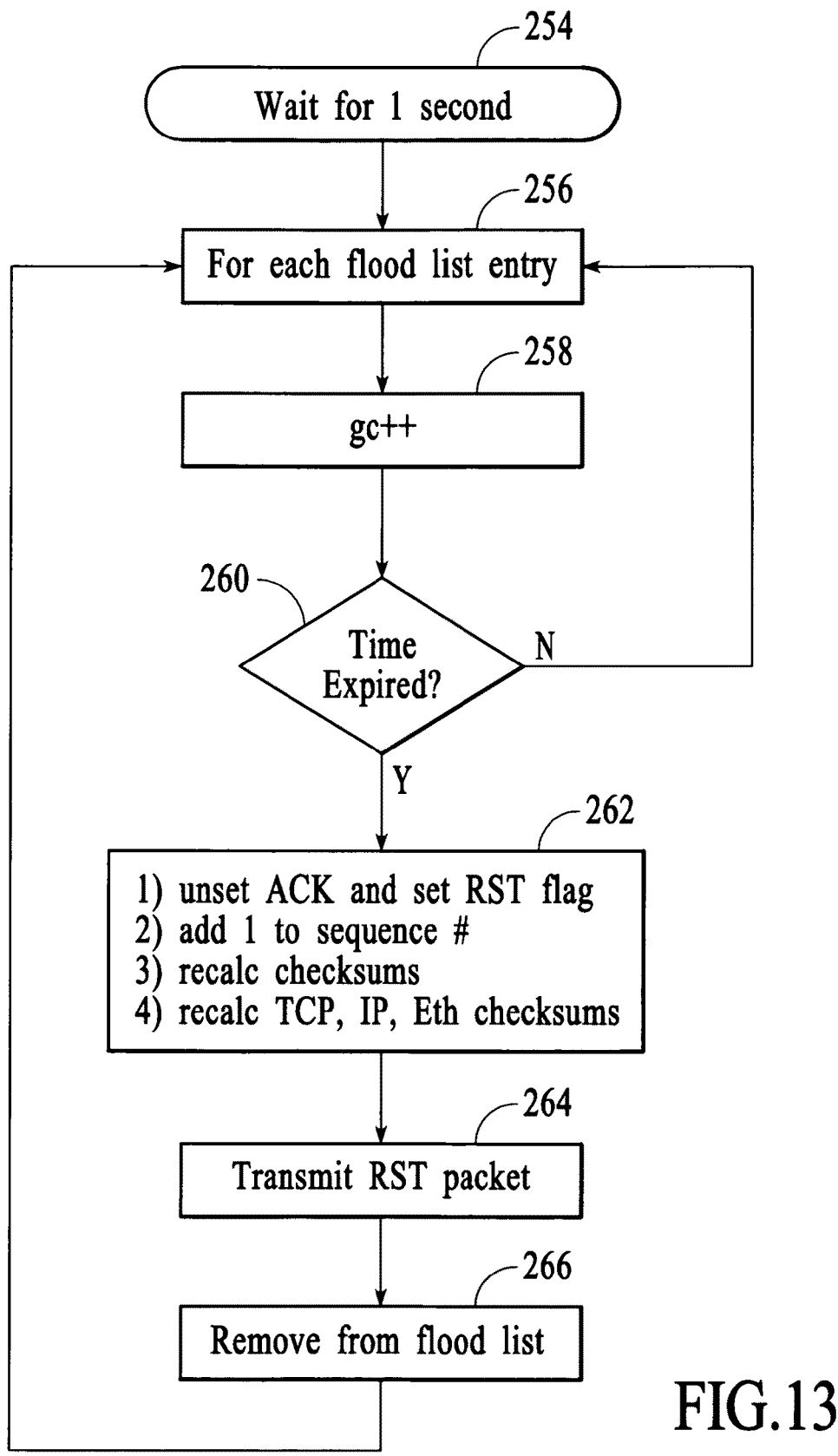
FIG. 13 is a flow chart illustrating the process of "garbage collection" in flood lists in accordance with preferred embodiments of the present invention.

As illustrated in FIG. 13, in order to keep the flood lists from filling up with stale entries, the data protection system must free up state registers when the protocol information is not accessed within specific time frames, such as when a three-way handshake is initiated by a client, but the transaction is not closed. After the system receives a packet, it for one second at step 254, then proceeds to step 256, where the packet is checked against each flood list entry and passed to step 258. At step 258, the system checks for stale entries (or garbage collection) in the flood lists and proceeds to step 260, where it determines if time has expired. If time has expired at step 260, then the packet proceeds to step 262; if not, then the system returns to step 256 to check each flood entry list again. At step 262, the system unsets the ACK bit and sets the Reset flag, adds 1 to the sequence number, recalculating the checksums, and then recalculates the checksums for TCP, IP, and Ethernet protocols. The system proceeds to step 264, where the Reset packet is transmitted; it then proceeds to step 266 and removes the packet from the flood list. The system then proceeds to step 256. It should be noted that if time expires for the request, then the system sends the Reset flag, terminating the connection.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. As will also be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A data protection system for filtering packets between at least an internet network and an internal network, wherein data is transmitted and received in the form of a plurality of packets, comprising:
   a first interface circuit for coupling packets to and from the internet network;
   a second interface circuit for coupling packets to and from the internal network;
   a filtering circuit coupled between the first interface circuit and the second interface circuit;
   wherein, as a packet is being received and transmitted between the first and second interface circuits, the packet is simultaneously subjected to one or more filtering criteria by the filtering circuit, wherein an end portion of the packet is selectively altered by the filtering circuit based on the filtering criteria, wherein the packet is selectively altered to be invalid if a determination has not been made as to whether the packet is valid or invalid by the time the end portion of the packet is received.

2. The system of claim 1, wherein the filtering criteria determine whether the packet is to be a valid packet or an invalid packet, wherein the packet is selectively altered to be invalid if it was determined that the packet should be an invalid packet.

3. The system of claim 1, wherein the filtering circuit includes at least first logic for determining characteristics of the packet being received and transmitted between the first and second interface circuits and at least a filter portion that subjects the packet to the plurality of filtering criteria while the packet is being received and transmitted between the first and second interface circuits.

4. The system of claim 3, wherein the filter portion includes at least a stateful filter portion and a non-stateful filter portion.

5. The system of claim 4, wherein the stateful filter portion subjects the packet to one or more stateful filtering criterion and the non-stateful filter portion subjects the packet to one or more non-stateful filtering criterion.

6. The system of claim 4, wherein the stateful filter portion subjects the packet to one or more stateful filtering criterion while the non-stateful filter portion subjects the packet to one or more non-stateful filtering criterion.

7. The system of claim 6, wherein the stateful filtering criteria are dependent upon physical switch position, packet characteristics, clock time and/or user-specified criteria.

8. The system of claim 7, wherein the user-specified criteria are entered via a physical input device.

9. The system of claim 8, wherein the physical input device comprises one or more switches, an audio input device, or display input device.

10. The system of claim 9, wherein the one or more switches comprise a toggle switch, button switch or multi-state switch.

11. The system of claim 7, wherein the user specified criteria are entered via a configuration software.

12. The system of claim 11, wherein the user specified criteria are transferred from the configuration software to the system using a network protocol, infrared port or cable attachment.

13. The system of claim 4, wherein a result aggregator logic receives one or more signals from the stateful filter portion and the non-stateful filter portion, wherein based on the received signals the result aggregator logic controls whether the packet is selectively altered to be invalid.

14. The system of claim 13, wherein the result aggregator logic receives a completion signal that indicates whether the stateful and/or non-stateful filter portions have subjected the packet to all of the filtering criteria.

15. The system of claim 14, wherein the packet is selectively altered by the filtering circuit to be invalid in response to the completion signal not being received by the result aggregator logic by a time when the end portion of the packet has been received.

16. The system of claim 1, wherein the packet is subjected to the plurality of filtering criteria in parallel with the packet being received and transmitted between the first and second interface circuits.

17. The system of claim 1, wherein the packet is subjected to the plurality of filtering criteria in real time with the packet being received and transmitted between the first and second interface circuits.

18. The system of claim 1, further comprising one or more physical switches, wherein the packet is selectively subjected to the filtering criteria based on the state of the one or more physical switches.

19. The system of claim 18, wherein the state of the one or more physical switches selectively enable or disable a predetermined portion of the filtering criteria.

20. The system of claim 18, wherein the state of the one or more physical switches selectively enable or disable a predetermined portion of the filtering criteria based on whether a computer coupled to the internal network is controlled to operate in a client mode or a server mode.

21. The system of claim 18, wherein the state of the one or more physical switches selectively controls a configuration or reconfiguration operation of the filtering circuit.

22. The system of claim 18, wherein the state of the one or more physical switches selectively controls a reset operation of the filtering circuit.

23. The system of claim 1, further comprising one or more visual or audio feedback devices, wherein the one or more visual or audio feedback devices selectively provide visual or audio feedback of the operation or status of the system.

24. The system of claim 23, wherein the one or more visual or audio feedback devices provide visual or audio feedback that the system is powered or operational.

25. The system of claim 23, wherein the one or more visual or audio feedback devices provide visual or audio feedback that the system is subjecting a packet to the filtering criteria.

26. The system of claim 23, wherein the one or more visual or audio feedback devices provide visual or audio feedback that the system has rejected one or more packets.

27. The system of claim 23, wherein the one or more visual or audio feedback devices provide visual or audio feedback that a computer coupled to the internal network is suspected to be under attack.

28. The system of claim 27, wherein the one or more visual or audio feedback devices provide visual or audio feedback of an estimated severity of the attack.

29. The system of claim 23, wherein the one or more visual or audio feedback devices provide visual or audio feedback of a state of the system until the one or more visual or audio feedback. devices are reset by a user.

30. The system of claim 29, wherein the one or more visual or audio feedback devices are reset by the state of a physical switch.

31. The system of claim 23, wherein the one or more visual or audio feedback devices comprise at least one light source, wherein the light source is selectively controlled to provide information indicative of the operation or status of the system.

32. The system of claim 31, wherein the light source is controlled to have a first color or a second color depending on the operation or status of the system.

33. The system of claim 31, wherein The light source is controlled to selectively blink depending on the operation or status of the system.

34. The system of claim 33, wherein the light source is controlled to selectively blink at a rate that is indicative of a severity level of a suspected attack on a computer coupled to the internal network.

35. The system of claim 31, wherein the at least one light source comprises an LED.

36. The system of claim 23, wherein the one or more visual or audio feedback devices comprise a speaker.

* * * * *